United States Patent
Yamashita

(10) Patent No.: US 7,116,609 B2
(45) Date of Patent: Oct. 3, 2006

(54) OPTICAL STORAGE SYSTEM AND CONTROL METHOD

(75) Inventor: Tomonori Yamashita, Kato (JP)

(73) Assignee: Fujitsu Limited, Kawasaki (JP)

( * ) Notice: Subject to any disclaimer, the term of this patent is extended or adjusted under 35 U.S.C. 154(b) by 64 days.

(21) Appl. No.: 11/038,542

(22) Filed: Jan. 21, 2005

(65) Prior Publication Data

US 2005/0162999 A1     Jul. 28, 2005

Related U.S. Application Data

(63) Continuation of application No. PCT/JP03/00405, filed on Jan. 20, 2003.

(51) Int. Cl.
*G11B 7/00*     (2006.01)

(52) U.S. Cl. .............................. 369/44.29; 369/53.28; 369/44.25

(58) Field of Classification Search ............. 369/44.29, 369/44.25, 53.28
See application file for complete search history.

(56) References Cited

U.S. PATENT DOCUMENTS

| | | | | |
|---|---|---|---|---|
| 5,970,032 | A * | 10/1999 | Ikeda et al. ............... | 369/44.29 |
| 6,381,201 | B1 * | 4/2002 | Shihara et al. ........... | 369/32.01 |
| 6,388,963 | B1 * | 5/2002 | Tanaka ..................... | 369/44.26 |
| 6,633,522 | B1 * | 10/2003 | Ryu ........................ | 369/44.29 |

FOREIGN PATENT DOCUMENTS

| | | |
|---|---|---|
| JP | 6-86444 | 3/1994 |
| JP | 8-102071 | 4/1996 |
| JP | 2000-339712 | 12/2000 |
| JP | 2001-331949 | 11/2001 |

OTHER PUBLICATIONS

International Search Report for Corresponding Application PCT/JP03/00405 mailed Nov. 11, 2003.

\* cited by examiner

*Primary Examiner*—Thang V. Tran
*Assistant Examiner*—Adam R. Giesy
(74) *Attorney, Agent, or Firm*—Staas & Halsey LLP

(57) ABSTRACT

A reference-position learning unit measures a current of one rotation of a medium in a state in which the focus of an objective lens is pulled-in by a focus pull-in control unit at a predetermined point in the radial direction of the medium upon insertion of the medium, calculates a mean current value thereof, and stores the calculated mean current value in the memory as a reference current value for positioning the objective lens at a reference position at which focus pull-in control is started. In focus pull-in performed after a learning process, a reference-position control unit positions the objective lens at a reference position obtained through a learning process in accordance with the reference current, and then, causes the focus pull-in control unit to perform focus pull-in.

18 Claims, 19 Drawing Sheets

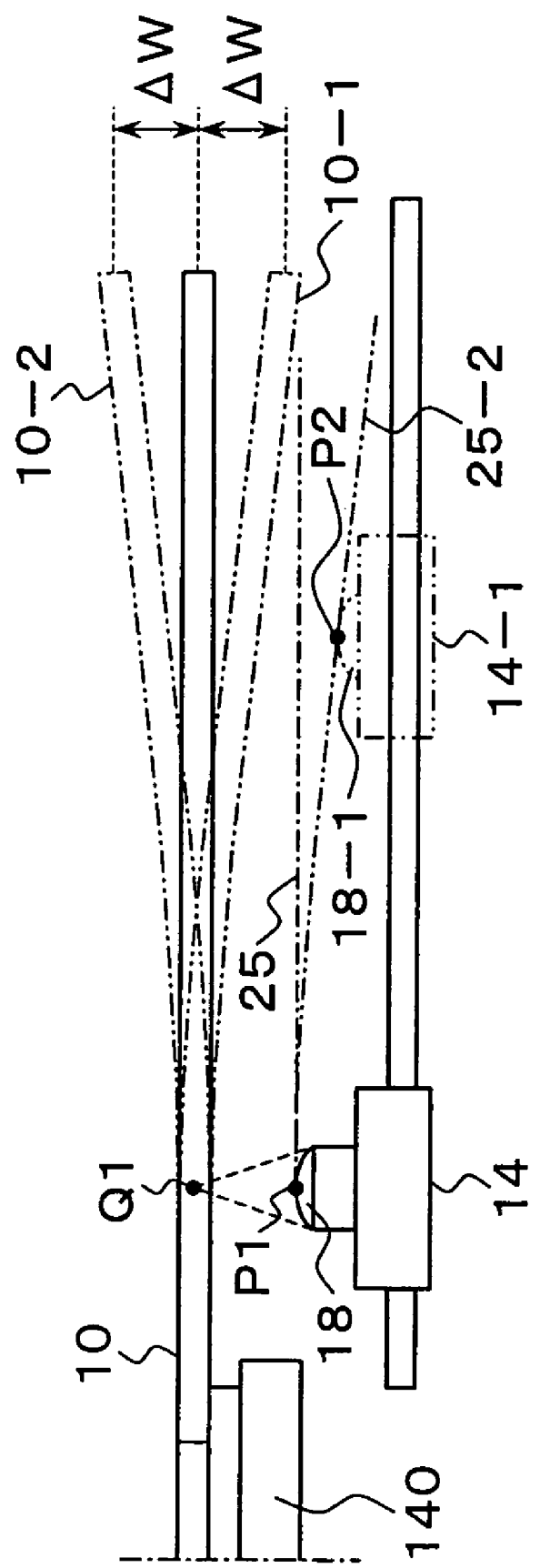

FOCUS DRIVING CURRENT

REFERENCE SIGNAL IN ONE CYCLE

| TRACK POSITION | MEAN CURRENT VALUE | SURFACE WOBBLING (CURRENT AMPLITUDE) | MEASURED CURRENT VALUE IN ONE ROTATION OF MEDIUM |
|---|---|---|---|
| INNER CIRCUMFERENCE | Iin | Ain | 01234566543210 |
| MIDDLE CIRCUMFERENCE | Imid | Amid | 01234566543210 |
| OUTER CIRCUMFERENCE | Iout | Aout | 01234566543210 |

| TRACK NUMBER | REFERENCE CURRENT VALUE | SURFACE WOBBLING (CURRENT AMPLITUDE) |
|---|---|---|
| 00000 | $I_1$ | $A_1$ |
| 00001 | $I_2$ | $A_2$ |
| 00002 | $I_3$ | $A_3$ |
| 00003 | $I_4$ | $A_4$ |
| ⋮ | ⋮ | ⋮ |
| 100000 | $I_{10000}$ | $A_{10000}$ |
| ⋮ | ⋮ | ⋮ |
| 200000 | $I_{20000}$ | $A_{20000}$ |

| ROTATION START TIMING | $T_{START}$ |
|---|---|
| ROTATION STOP TIMING | $T_{STOP}$ |

| ZONE NUMBER | REFERENCE CURRENT VALUE | SURFACE WOBBLING (CURRENT AMPLITUDE) |
|---|---|---|
| Z1 | $I_1$ | $A_1$ |
| Z2 | $I_2$ | $A_2$ |
| Z3 | $I_3$ | $A_3$ |
| Z4 | $I_4$ | $A_4$ |
| ⋮ | ⋮ | ⋮ |
| Zn | $I_n$ | $A_n$ |

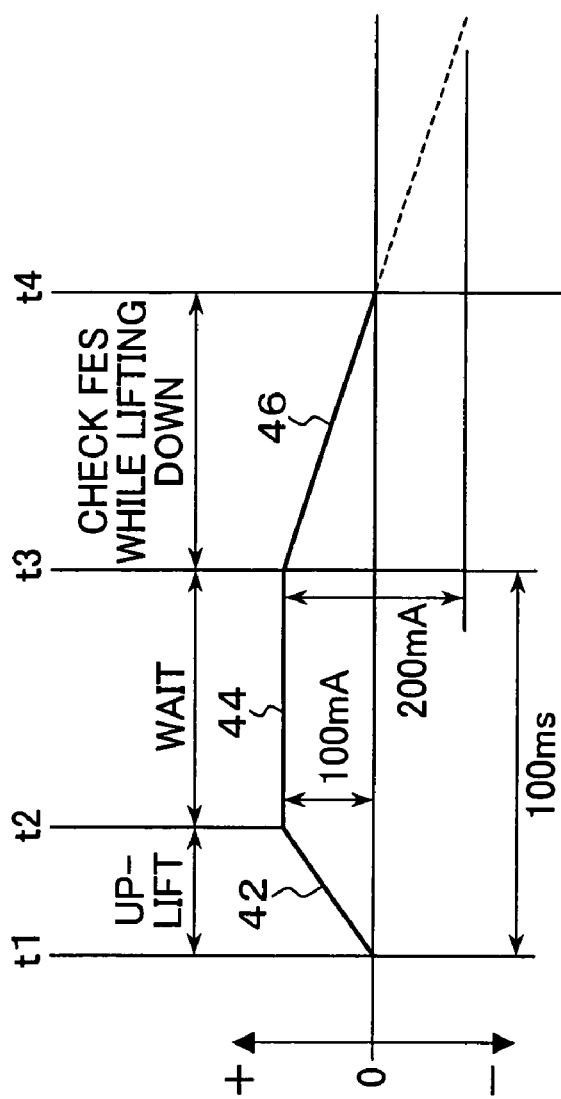
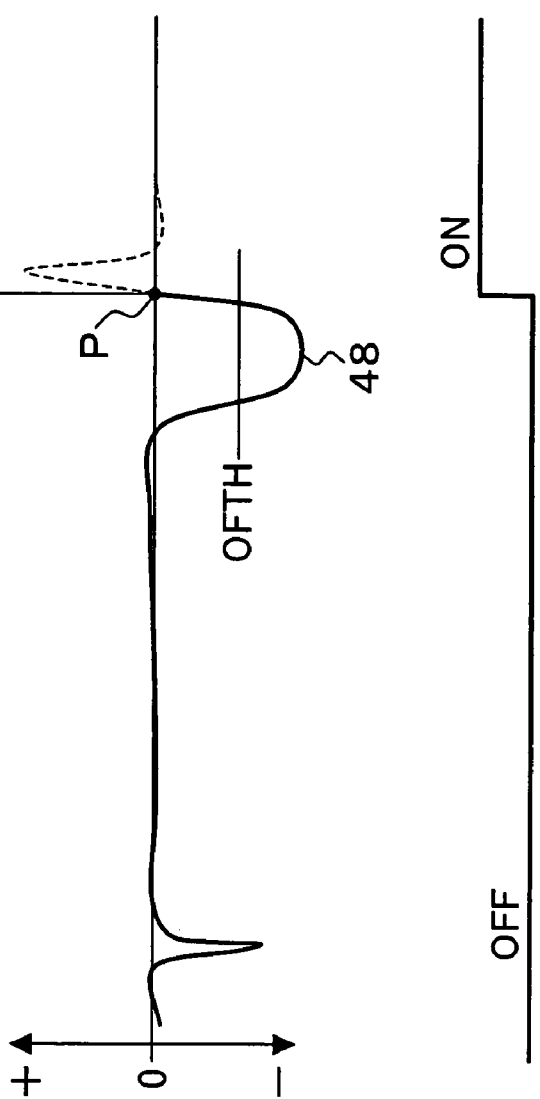
FIG. 11A  FOCUS DRIVING CURRENT
FIG. 11B  FES (E1)
FIG. 11C  SERVO-LOOP SIGNAL E4

FIG. 12A
POSITIONS OF MEDIUM AND LENS
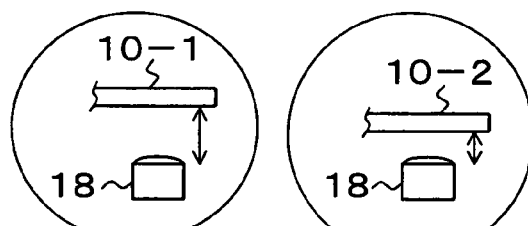
FIG. 12B
POSITION OF RECORDING LAYER
FIG. 12C
FES (E1)
FIG. 12D
REFERENCE SIGNAL IN ONE ROTATION
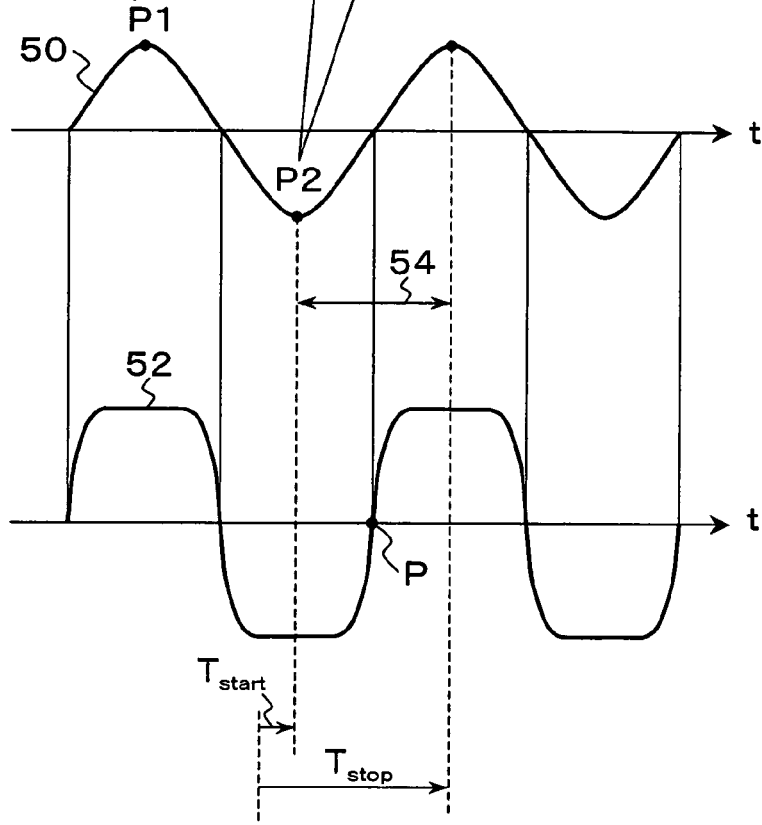
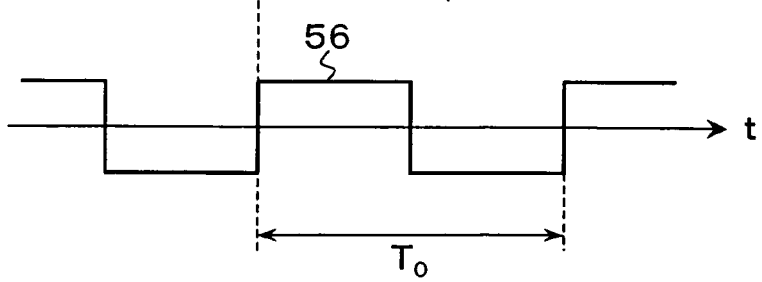

OPTICAL STORAGE SYSTEM AND CONTROL METHOD

This application is a continuation of PCT/JP03/00405, filed Jan. 20, 2003.

BACKGROUND OF THE INVENTION

1. Field of the Invention

The present invention relates to optical storage systems and control methods for optically recording and reproducing information in or from a removable medium such as an MO cartridge, and in particular, relates to optical storage systems and control methods for ensuring speed-up, stability, and safety in focus pull-in.

2. Description of the Related Arts

Conventionally, in an optical storage system known as an optical disk drive using an MO cartridge medium, when the data recorded in the medium is to be read out or when data is to be recorded in the medium, focus control for concentrating an optical beam on a recording medium which is on the medium is required.

In order to perform the focus control, first, it is necessary to learn the position at which the optical beam is currently concentrated. However, a focus error signal (FES) is not output when the position at which the optical beam is concentrated is away from recording layer. Therefore, a lens actuator is moved to an area in which the beam can be concentrated at the position near the recording layer of the medium, and focus pull-in process for closing a focus servo loop is performed at the point when focus zero-cross is detected.

In the focus pull-in process, the focus error signal is output even when the concentration position is at the surface (protective surface of the recording layer) of the medium. Therefore, generally, the lens actuator is once caused to approach the medium by the degree that it does not hits the medium, and then, the lens actuator is slowly lifted down and the pull-in process is performed at the point when the focus zero-cross is first recognized.

However, in such conventional optical storage system, in some cases, a medium goes into the movement rage of the lens actuator due to, for example, a chucking state upon insertion of the medium or warpage of the medium per se. In those cases, when the lens actuator is caused to approach the medium for performing the focus pull-in process, at worst, the lens actuator comes in contact with the medium and the medium may be damaged.

More specifically, the lens actuator is supported by a carriage by means of a spring, and, in a state in which current is not caused to flow in the drive circuit, the deviation between the position of the optical beam focal point and the position of the recording layer of the medium is designed to be about 50 μm. Therefore, in the focus pull-in control, first, the lens actuator is moved toward the medium by about 300 μm, and the lens actuator is slowly moved therefrom toward the opposite direction by about 600 μm. During this period, the focus servo loop is closed at the point when the zero-cross of the focus error signal is detected, thereby maintaining the focal point on the recording layer of the medium. The problem herein resides in that whether the lens actuator comes in contact with the medium when the lens actuator is moved in the direction toward the medium by 300 μm.

Conventionally, a countermeasure is taken by providing a clearance for avoiding the contact, however, the clearance cannot be reserved in a recent thinned system. Responding to such problem, the standards of mediums are made more strict and the height of optical storage systems are increased in order to prevent the contact between a medium and a lens actuator. However, recently, the importance of down-sizing and thinning of the systems is further rising, and there is a need to avoid the contact between a lens actuator and a medium in a focus servo pull-in process without making the standards of mediums more strict and increasing the height of the optical storage systems.

SUMMARY OF THE INVENTION

An object of the present invention is to provide an optical storage system and control method for performing focus pull-in control without causing a lens actuator to come in contact with a medium even when warpage or surface wobbling is present in the medium.

The present invention is directed to an optical storage system having a carriage actuator for moving an objective lens, which is for irradiating a medium with an optical beam, in the direction across tracks of the medium, a lens actuator for moving the objective lens in the direction toward the medium, a focus error signal generation unit for generating a focus error signal indicating deviation between the focal point of the optical beam and a recording layer of the medium in accordance with received output of the light returned from the medium, and a focus pull-in control unit for closing a focus servo loop at a point where the focus error signal crosses zero while slowly moving the lens actuator in the direction getting away from the medium after the lens actuator is moved in the direction toward the medium by a predetermined distance in a state in which the medium is being rotated.

In the present invention, an optical storage system of this type is provided with a reference-position learning unit for measuring a focus driving current of one rotation of the medium in a state in which the focus of the objective lens is pulled-in by the focus pull-in control unit at a predetermined point in the radial direction of the medium upon insertion of the medium, calculating a mean current value thereof, and storing the calculated mean current value in a memory as a reference current value for positioning the objective lens at a reference position (reference lens position) at which focus pull-in control is started; and a reference-position control unit for causing the focus pull-in control unit to perform focus pull-in after positioning the objective lens in accordance with the reference current when focus pull-in is performed after the learning process.

According to the above described optical storage system of the present invention, when the medium is inclined due to a chucking state or when the medium is warped, the clearance between a medium and the lens actuator is the widest in the vicinity of the inner circumference of the medium. Therefore, there performed is a learning process in which focus pull-in control is performed there at, an indicated current value output to a focus driving circuit is measured during one rotation of the medium and a mean current thereof is obtained, and the mean current is obtained as a reference current for driving the lens actuator to a reference position at which focus pull-in is started. When the reference current value obtained through the learning process is retained until the medium is changed and the value is used as a reference current when next focus pull-in control is performed, approximate focal point can be presumed and stable focus pull-in control can be realized.

Herein, the reference-position learning unit measures a current of one rotation of the medium at least two points in the radial direction of the medium and stores the reference current values; and the reference-position control unit selects a reference current corresponding to a position of the objective lens in the radius of the medium and positions the objective lens. Therefore, when a reference current is further measured in the outer-circumferential area in addition to the reference current value obtained in the measurement in the inner-circumferential area, the risk of contact between the medium and the lens actuator is reduced also in the outer-circumferential area.

After a current of one rotation of the medium is measured in a state in which focus of the objective lens is pulled-in at a predetermined point in the inner circumference of the medium by the focus pull-in control unit, the reference-position learning unit moves the objective lens to a predetermined point in the outer circumferential side while keeping the focus servo loop closed and measures a current of one rotation of the medium.

Accordingly, the reference current is obtained by measurement at arbitrary plural points in the radial direction of the medium, and, after a learning process, focus pull-in control can be performed without causing contact between the medium and the lens actuator regardless of the position of the lens actuator with respect to the area of the medium.

The reference-position control unit obtains a reference current corresponding to a position other than the measurement points in the radius of the medium from a relational expression of a line relating the values of the reference current obtained from the values of the current measured at the two points in the radial direction of the medium. By virtue of such linear interpolation, the reference current of all areas of the medium can be calculated by measurement at two points.

Based on the measured current of one rotation of the medium, the reference-position learning unit obtains the value of current displacement (amplitude), as a surface wobbling quantity, corresponding to the movement amount of the medium in the direction toward the objective lens and the movement amount of the medium in the direction getting away from the objective lens, wherein each of the amounts is that in one rotation of the medium, and stores the obtained value in the memory; and, after the objective lens is positioned in accordance with the reference current, the reference-position control unit sets a movement amount twice the surface wobbling quantity as a movement distance of the objective lens in the direction toward the medium, and causes the focus pull-in control unit to perform focus pull-in. When the movement amount of the lens actuator for focus pull-in is changed in accordance with the surface wobbling quantity of the medium as described above, focus pull-in is performed with minimum movement even if surface wobbling is present in the medium.

Based on the measured current of one rotation of the medium, the reference-position learning unit obtains the value of current displacement, as a surface wobbling quantity, corresponding to the movement amount of the medium in the direction toward the objective lens and the movement amount of the medium in the direction getting away from the objective lens, wherein each of the amounts is that in one rotation of the medium, and stores the obtained value in the memory; and, when the value of the surface wobbling quantity at a point in the radius of the medium at which focus pull-in is to be performed exceeds a predetermined limit value, the reference-position control unit adjusts the reference current such that the objective lens is positioned away from the medium and positions the objective lens thereat, and then, causes the focus pull-in control unit to perform focus pull-in. For example, when the value of the surface wobbling quantity at a point in the radius of the medium at which focus pull-in is to be performed exceeds a predetermined limit value, the reference-position control unit adjusts the reference current such that the objective lens is positioned away from the medium by a distance one quarter of the surface wobbling quantity and positions the objective lens.

Therefore, in a case in which surface wobbling is large in the outer-circumferential side of the medium and the medium collides with the lens actuator at the position corresponding to the reference current obtained through measurement due to surface wobbling, when the reference current is adjusted in accordance with the surface wobbling such that the lens actuator is positioned away from the medium, the collision with the medium is not caused even when the reference current is caused to flow upon focus pull-in and the lens actuator is set at the reference position.

Based on the measured current of one rotation of the medium, the reference-position learning unit obtains a period in one rotation of the medium in which the medium is moving in the direction getting away from the objective lens as a pull-in rotation period and stores the period in the memory; and the reference-position control unit positions the objective lens in accordance with the reference current, and then, without moving the objective lens by the focus pull-in control unit, causes focus pull-in to be performed at a timing when the focus error signal crosses zero within the pull-in rotation period. As described above, in a state in which the lens actuator is set at the reference position for focus pull-in control by the reference current, there enabled is pull-in control in which zero-cross of the focus error signal is detected at a timing when the position of the recording layer of the medium near the objective lens is getting away therefrom due to surface wobbling and the focus servo loop is closed. In this case, since the objective lens is not moved in the direction toward the medium, there is no risk of contact with the medium.

Based on the measured current of one rotation of the medium, the reference-position learning unit obtains a rotation period in one rotation of the medium in which the medium is moving in the direction getting away from the objective lens as a pull-in rotation period and stores the period in the memory; and, at a start timing of the pull-in rotation period after the objective lens is positioned in accordance with the reference current, the reference-position control unit causes the focus pull-in control unit to perform focus pull-in by starting movement of the objective lens in the direction getting away from the medium. When the lens actuator is further driven in the direction getting away from the medium at a timing when the position of the recording layer of the medium near the lens actuator is getting away from the lens actuator as described above, zero-cross of the focus error signal can be quickly detected and the focus pull-in control is speeded up without causing contact with the medium.

The present invention provides a control method of an optical storage system. Specifically, the present invention provides a control method of an optical storage system having a carriage actuator for moving an objective lens, which is for irradiating a medium with an optical beam, in the direction across tracks of the medium, a lens actuator for moving the objective lens in the direction toward the medium, a focus error signal generation circuit for generating a focus error signal indicating deviation between the focal point of the optical beam and a recording layer of the medium in accordance with received output of the light returned from the medium, and a focus pull-in control unit for closing a focus servo loop at a point where the focus error signal crosses zero while slowly moving the objective lens in the direction getting away from the medium after the objective lens is moved in the direction toward the medium by a predetermined distance in a state in which the medium is being rotated, the control method comprising: a reference-position learning step of measuring a current of one rotation of the medium in a state in which the focus of the objective lens is pulled-in by the focus pull-in control unit at a predetermined point in the radial direction of the medium upon insertion of the medium, calculating a mean current value thereof, and storing the calculated mean current value in a memory as a reference current value for positioning the objective lens at a reference position at which focus pull-in control is started; and a reference-position control step of causing the focus pull-in control unit to perform focus pull-in after positioning the objective lens in accordance with the reference current when focus pull-in is performed after the learning process. The details of the control method is basically same as that of the optical storage system.

BRIEF DESCRIPTION OF THE DRAWINGS

FIG. 7 is an explanatory view of the reference lens position in the radial direction of the medium in the case in which surface wobbling is present in the medium;

FIGS. 9A, 9B, and 9C are explanatory drawings of a memory table generated in a learning process of the present invention;

FIG. 10 is an explanatory drawing of a control table storing the values of the reference current and surface wobbling in a zone-unit;

FIGS. 11A, 11B, and 11C are time charts of the focus driving current and a focus error signal in the focus pull-in control performed at the inner-circumferential position initially in a current measurement process;

FIGS. 12A, 12B, 12C, and 12D are time charts showing the positions of the recording layer corresponding to surface wobbling of the medium in a state in which the objective lens is fixed, the focus error signal, and the reference signal of one rotation;

DETAILED DESCRIPTION OF THE INVENTION

Figure 1:
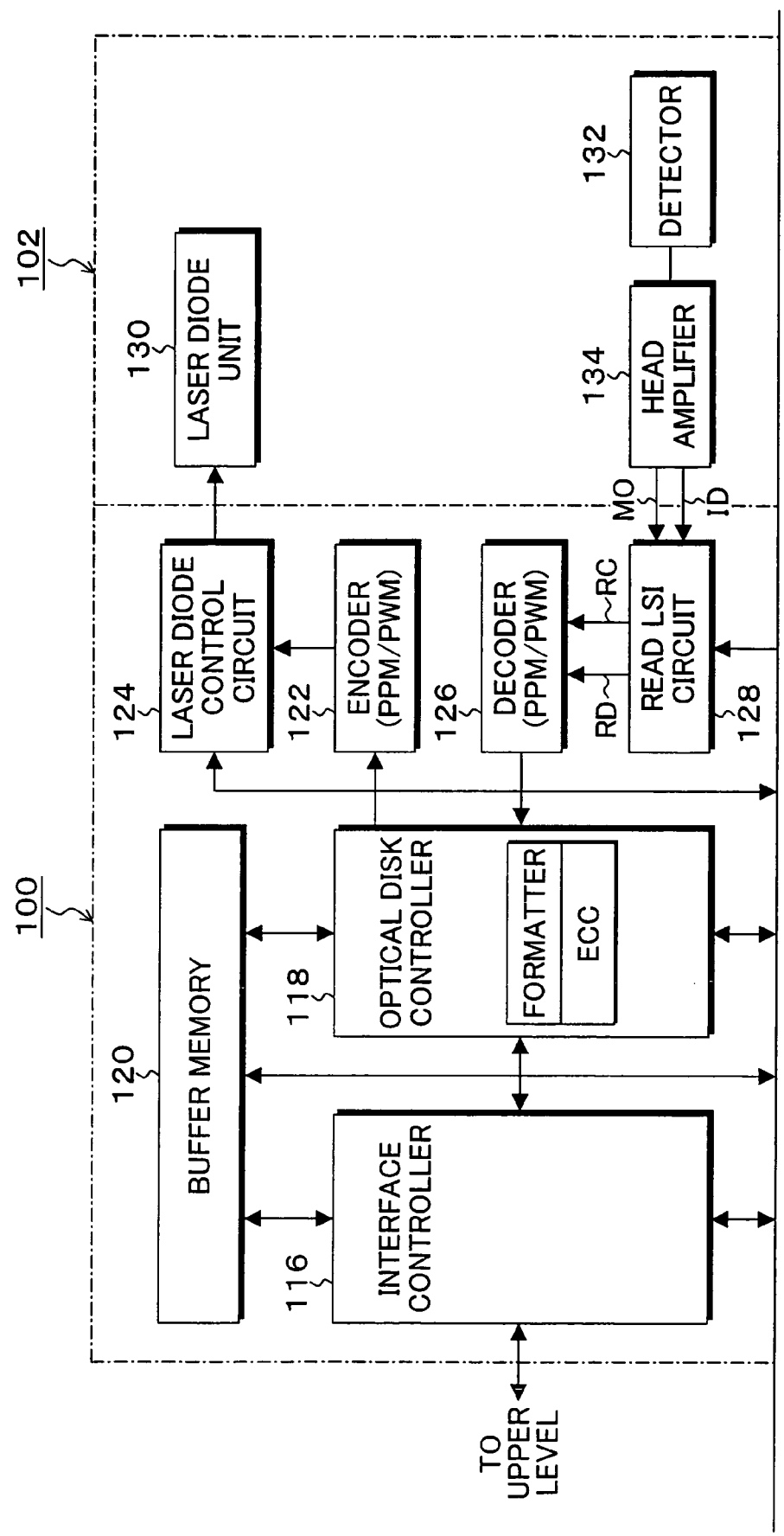
FIG. 1 is a block diagram of an optical storage system to which the present invention is applied.
Figure 2:
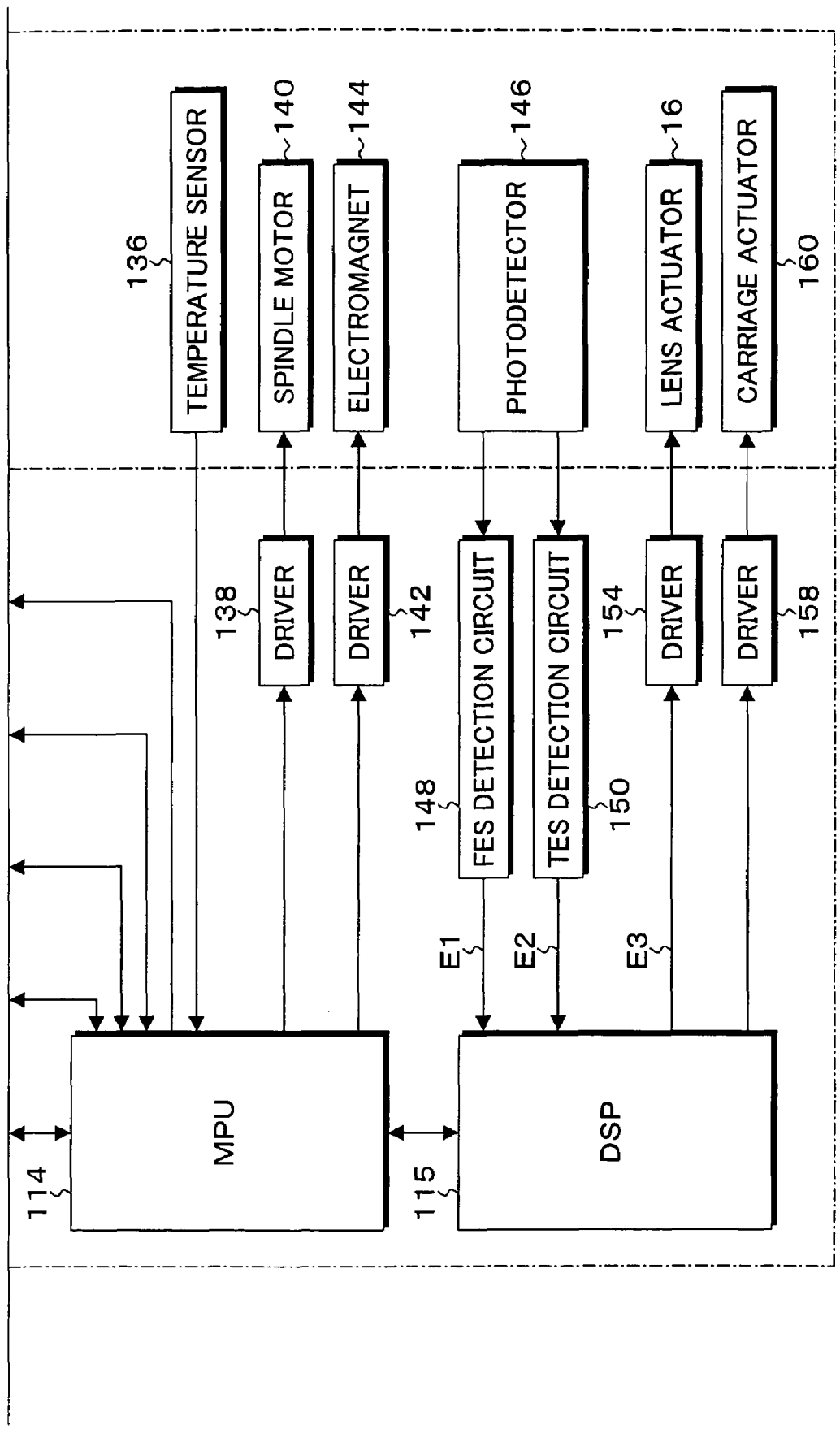
FIG. 2 is a block diagram of the optical storage system subsequent to that of FIG. 1.

FIG. 1 and FIG. 2 are block diagrams of an optical disk drive which serves as an optical storage system of the present invention, wherein a magneto-optical disk (MO) cartridge is employed as an example of a magneto-optical recording medium. The optical disk drive is a drive which can perform recording and reproduction that utilizing lands, lands and grooves, or grooves of a medium, and consists of a controller 100 and an enclosure 102. In the controller 100, an MPU 114 for performing general control, an interface controller 116 for performing communication with a host, an optical disk controller (ODC) 118 provided with a formatter and an ECC function, which are necessary to read/write data from/to a medium, and a buffer memory 120 are provided.

For the optical disk controller 118, an encoder 122 is provided as a write system. As a read system for the optical disk controller 118, a detector 132, a head amplifier 134, a read LSI circuit 128, and a decoder 126 are provided. In addition, a laser diode control circuit 124, and a laser diode unit 130 are provided. The detector 132 detects return light from a magneto-optical disk, and outputs an ID signal and an MO signal to the read LSI circuit 128 via the head amplifier 134. The read LSI circuit 128 generates a read clock and read data from the input ID signal and MO signal, and outputs the read clock and read data to the decoder 126. An environmental temperature in the system detected by a temperature sensor 136 is input to the MPU 114, and the power of the light to be emitted from the laser diode unit 130 is optimized on the basis of the environmental temperature. In addition, the MPU 114 controls a spindle motor 140 via a driver 138, and also controls an electromagnet 144 via a driver 142. The electromagnet 144 supplies an external magnetic field upon recording and erasing employing an MO cartridge. When a super-resolution magneto-optical medium (MSR medium) is employed in a 1.3 GB or 2.3 GB MO cartridge, the electromagnet 144 also supplies an external magnetic field upon reproduction. A DSP 115 performs servo control for positioning an objective lens mounted on a head actuator to a target position with respect to a magneto-optical disk based on a servo error signal.

The servo control has two functions, i.e., track control of positioning the objective lens at a target track position of a medium and focus control of controlling the position of the objective lens so as to achieve focus on the medium. Corresponding to the servo control, a photodetector 146, a focus error signal detection circuit 148, and a track error signal detection circuit 150 are provided. For example, the focus error signal detection circuit 148 generates a focus error signal by means of a knife-edge method as an optical focus system.

In relation to the focusing control, the DSP 115 drives a lens actuator 16 by means of a driver 154, turns on focus servo according to focus pull-in control based on a learning process of the present invention, and positions the objective lens at a position where the lens can achieve focus in the direction of optical axis. In relation to the track control, a driver 158 drives a carriage actuator 160 employing a VCM, and positions the objective lens at the target track center on the medium.

Figure 3:
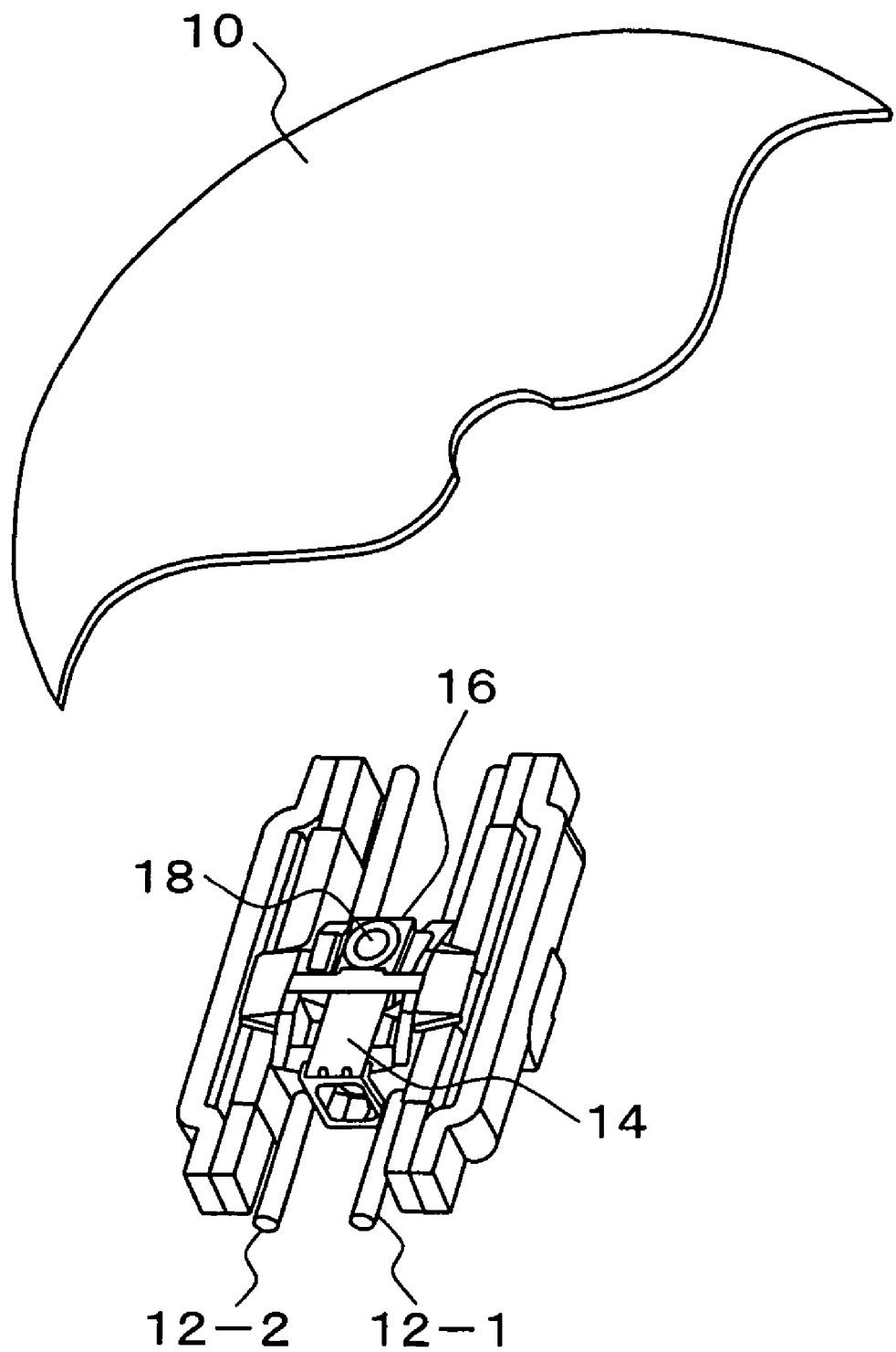
FIG. 3 is an explanatory view of an MO medium and a carriage.

FIG. 3 is an explanatory view of an MO medium and a carriage in an optical storage system of the present invention. In FIG. 3, an MO medium 10 is shown in the manner such that a part thereof is omitted; and, in a state in which the MO medium 10 is loaded from outside and chucked on a spindle motor, a carriage 14 is positioned below the recording-medium surface of the MO medium 10. The carriage 14 moves a mounted objective lens 18 in the radial direction of the MO medium 10 along two rails 12-1 and 12-2 fixed on a housing of the system.

A lens actuator (focus actuator) 16 is also mounted on the carriage 14 which moves the objective lens 18 in the direction toward the MO medium 10.

Figure 4:
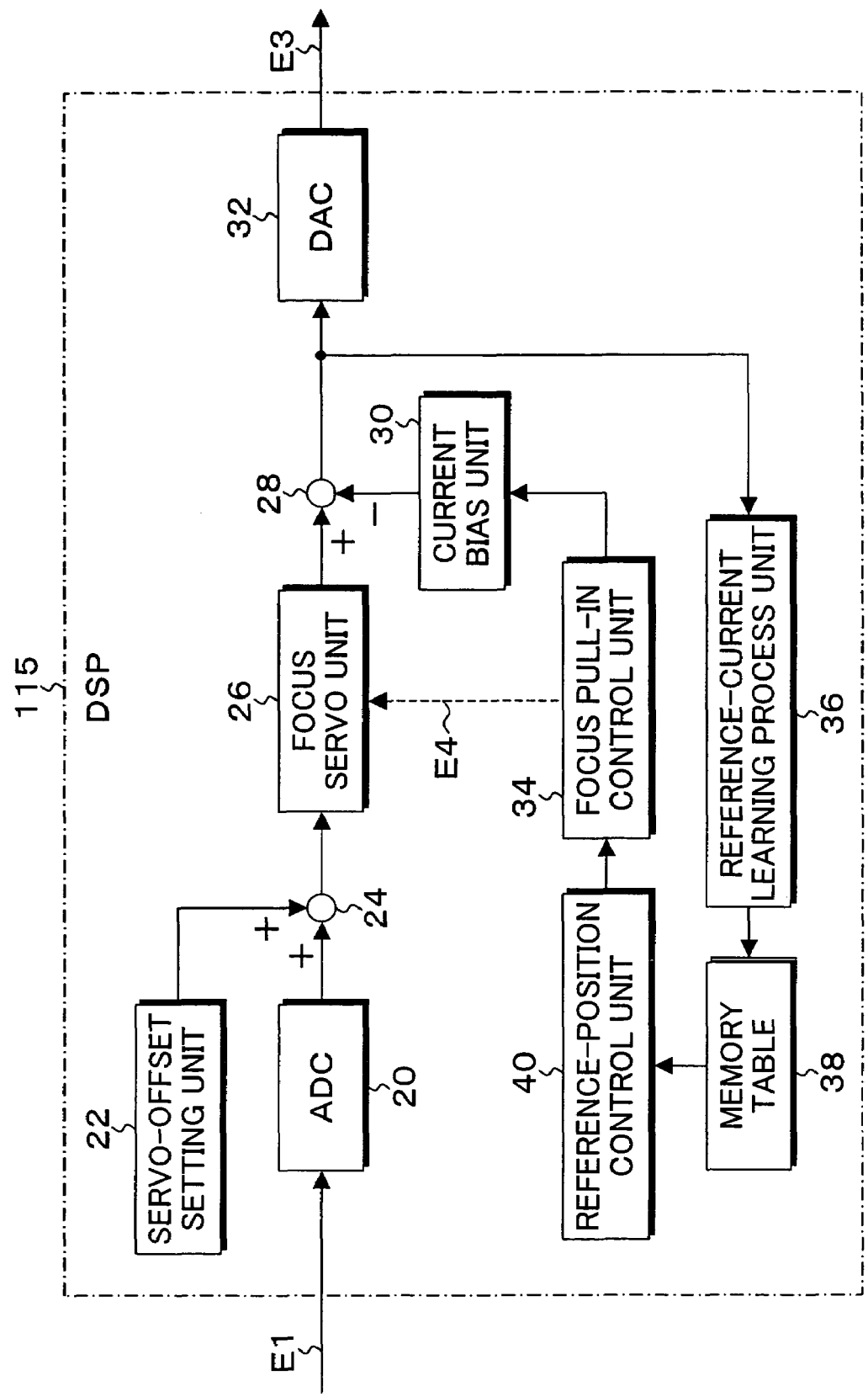
FIG. 4 is a block diagram of a functional configuration of focus pull-in control of the present invention.

FIG. 4 is a block diagram of a functional configuration of focus pull-in control of the present invention, which is realized as a function by means of program control performed by the DSP 115 in FIG. 1 and FIG. 2. In FIG. 4, a focus servo loop is configured by program control of the DSP 115. The focus servo loop consists of an AD converter 20, a servo-offset setting unit 22, an adder 24, a focus servo unit 26, an adder 28, a current bias unit 30, and a DA converter 32. The AD converter 20 converts a focus error signal E1 given from the focus error signal detection circuit 148 of FIG. 2 into digital data, and outputs the digital data to the adder 24. The servo-offset setting unit 22 sets servo-offset in accordance with needs. The focus servo unit 26 performs a PID process including phase compensation, and outputs a current indication value for driving the lens actuator. The adder 28 adds the current indication value output from the focus servo unit 26 and a current bias indication value output from the current bias unit 30, and outputs a current indication value, which is for the focus servo, to the DA converter 32. The DA converter 32 converts the current indication value input from the adder 28 to an analog current indication signal E3, and outputs the signal to the driver 154 of FIG. 2, thereby causing a driving current which is for the focus servo to flow in the lens actuator 16.

In addition, a focus pull-in control unit 34 is provided for the focus servo loop. Before performing a reference-current learning process, the focus pull-in control unit 34 moves the objective lens toward the medium by a predetermined distance while keeping the MO medium rotating. Then, while moving the objective lens slowly in the direction getting away from the MO medium, the focus pull-in control unit 34 turns on a servo loop control signal E4 at a point where the focus error signal E1 crosses zero, thereby closing the focus servo loop so as to perform focus pull-in control. In addition, after a reference current learning process is completed, the focus pull-in control unit 34 performs focus pull-in control in which a reference lens position of the objective lens according to a reference current obtained in a learning process is employed as a start position. In addition to the control performed in the first pull-in control in which the servo loop signal E4 is turned on at a point where the focus error signal crosses zero while the objective lens is moved slowly in the direction getting away from the medium after the objective lens has approached toward the medium side, the focus pull-in control performed after completion of the reference-current learning process can be performed such that, without moving the objective lens, the servo loop is turned on at a point where the focus error signal crosses zero by utilizing the movement due to surface wobbling of the MO medium, thereby performing pull-in control. In the present invention, with respect to the focus pull-in control unit 34, a reference-current learning process unit 36, a memory table 38, and a reference-position control unit 40 are further provided. When an MO medium is inserted into the optical storage system, in a state wherein focus of the objective lens is pulled in at a predetermined point in the radial direction of the medium, basically, at a predetermined point in an inner-circumferential side by means of the focus pull-in control unit 34, the reference-current learning process unit 36 measures a focus driving current of one rotation of the medium, specifically, measures the indicated current value for the DA converter 32, and stores the value in the memory table 38. Then, the reference-current learning process unit 36 calculates the value of a mean current of one rotation, and stores the calculated mean current value in the memory table 38 as the value of a reference current for positioning the objective lens at the reference lens position at which focus pull-in control is started. The mean current value is calculated by performing integration of the measured current of one rotation of the medium. The reference current is measured by the reference-current learning process unit 36 at two or more position in the radial direction of the MO medium, basically, at two points in the inner-circumferential side and the outer-circumferential side or three points at the outer circumference, the middle circumference, and the inner circumference; and the reference current representing the reference current value of each of the positions is obtained and stored in the memory table 38. The reference-current learning process unit 36 obtains the quantity of the surface wobbling of the medium at the measurement positions from the amplitude of the current of one rotation of the medium which has been obtained at the measurement points in the radial direction of the medium, and stores the quantity in the memory table 38. In addition, since, in the focus pull-in control after the reference-current learning process is completed, the focus pull-in control is performed by utilizing the movement of the surface wobbling of the medium without moving the objective lens, the rotation period in one rotation in which the medium is getting away from the objective lens 18 due to surface wobbling is detected as a pull-in rotation period and stored in the memory table 38. In relation to the reference current values and the surface wobbling quantity in the memory table 38, there prepared are, for example, a control table including the values of reference current and surface wobbling of each of track number or a control table including the values of the reference current and surface wobbling of each zone of the medium, wherein the values of the reference current and the surface wobbling of the positions other than the measurement points in the radial direction of the medium are calculated by means of interpolation processes employing a relational expression of the line connecting the two measurement points. It goes without saying that, without employing the control table, the values of the reference current and the surface wobbling of the position where focus pull-in is actually performed may be calculated each time for use from the relational expression of the line connecting the two measurement points. Upon focus pull-in which is performed after the learning process by the reference-current learning process unit 36, the reference-position control unit 40 causes the reference current corresponding to the position in the radial direction of the medium, of which current value is stored in the memory table 38, to flow in the lens actuator, thereby positioning the objective lens at the reference lens position, and then makes the focus pull-in control unit 34 perform focus pull-in control.

Figure 5:
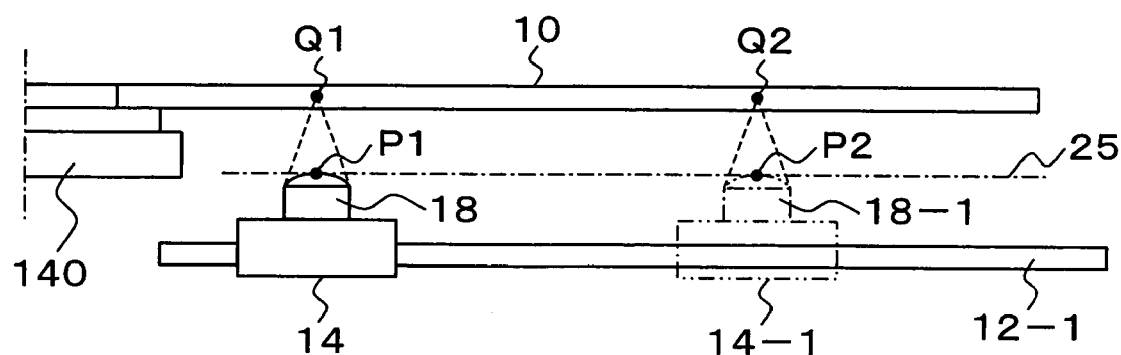
FIG. 5 is an explanatory view of a reference lens position in the radial direction of the medium in the case in which there is neither warpage nor surface wobbling present in the medium.

FIG. 5 is an explanatory view of a reference lens position in the radial direction of the medium obtained in the learning process in the case in which there is neither warpage nor surface wobbling present in the MO medium. In FIG. 5, in this example, the MO medium 10 loaded from outside and chucked with respect to the spindle motor 140 is in an ideal state in which neither warpage nor surface wobbling is present. In the focus pull-in control of the present invention, first, the carriage 14 is positioned at a predetermined position at the inner circumference of the MO medium 10, and then, focus pull-in control is performed so as to attain a focus pulled-in state in which a focal point Q1 of the optical beam of the objective lens 18 meets with the medium recording layer of the MO medium 10 and the focus servo loop is turned on. In this state, focus driving current of one rotation of the medium is measured, and the value of the mean current thereof is stored in the memory table 38 as the value of the reference current. The reference current I1 which is the mean current of one rotation of the medium obtained through the measurement of the focus driving current serves as the driving current for positioning the objective lens 18 at a point P1 serving as a focus point at which focus is pulled in. Subsequently, in a state in which the focus servo loop is turned on, the carriage 14 is moved to the position in the outer-circumferential side, i.e., the position of the carriage 14-1. The focus driving current of one rotation of the medium is measured at the position in the outer-circumferential side, and the value of the mean current thereof is obtained. The value of the mean current is stored in the memory table 38 as the value of a reference current I2 for performing drive so as to position the lens at a reference lens position at a predetermined position in the outer-circumferential side. Herein, since neither warpage nor surface wobbling is present in the MO medium 10, regarding the both positions of the inner-circumferential position of the carriage 14 and the outer-circumferential position of the carriage 14-1, the reference currents I1 and I2 each of which obtained as the mean current of the focus driving current of one rotation have the same value. Therefore, even at the position of the carriage 14-1 in the outer-circumferential side, a reference lens position P2 of the objective lens 18-1 according to the measured reference current I1 is at the same position as the reference lens position P1 of the objective lens 18 of the carriage 14 in the inner-circumferential side. A reference position line 25 connecting the two points of the reference lens positions P1 and P2 represents the reference lens position of this case with respect to the MO medium 10.

Figure 6:
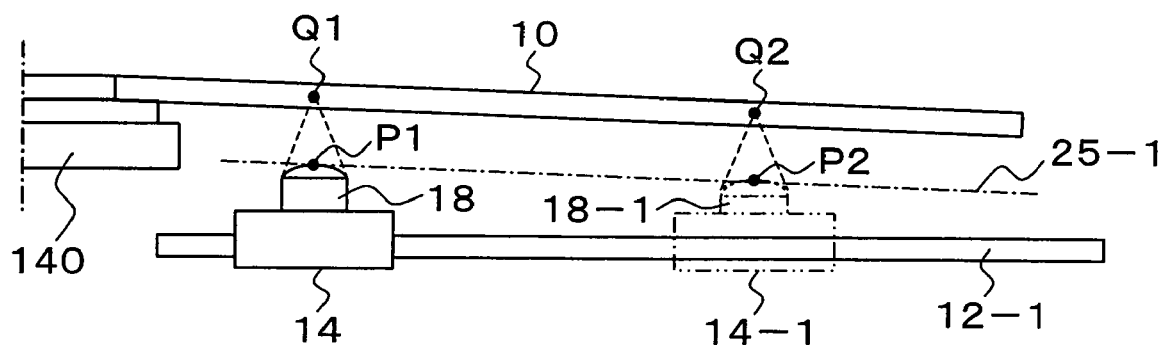
FIG. 6 is an explanatory view of the reference lens position in the radial direction of the medium in the case in which the medium is warped.

FIG. 6 is an explanatory view of the reference lens position in the case in which the loaded MO medium is warped. In the case of FIG. 6, the outer-circumferential side of the medium is downwardly warped in a state in which the MO medium 10 is loaded and chucked on the spindle motor 140.

In the same manner as the case of FIG. 5, the carriage 14 is positioned at a predetermined position in the inner-circumferential side with respect to such warped MO medium 10 and the focus pull-in control is performed, thereby obtaining the reference current I1. Accordingly, a focused state in which the objective lens 18 positions the optical beam focal point Q1 thereof on the recording layer of the MO medium 10 is attained, and the position of the objective lens 18 in this case serves as the reference lens position P1. Subsequently, in a state in which the focus servo loop is turned on, the carriage 14 is positioned at a predetermined position in the outer-circumferential side, i.e., the position of the carriage 14-1. In this state, the focus driving current of one rotation of the medium is measured, and the value of the mean current thereof is obtained. The value of the mean current is stored in the memory table 38 as the value of the reference current I2 in the outer-circumferential side position. The reference lens position P2 of the objective lens 18-1 in the outer-circumferential side according to the reference current I2 is at a lowered position, due to the warpage of the MO medium 10, with respect to the reference lens position P1 which is in the inner-circumferential side. When the values of the reference current I1 and I2 of the reference lens positions P1 and P2 at two points in the inner circumference and the outer circumference are obtained as described above, the reference lens positions indicated by a reference position line 25-1 which is the line connecting the two points in the radial direction of the medium can be obtained.

FIG. 7 is an explanatory view of the reference lens position in the radial direction of the medium in the case in which surface wobbling is present in the loaded MO medium. In FIG. 7, the surface of the MO medium 10 which has been loaded from outside and chucked on the spindle motor 140 is wobbled upon rotation of the medium due to, for example, the inclination of the rotation axis of the spindle motor 140, wherein the outer-circumferential side of the medium is wobbled to the upper and lower positions 10-1 and 10-2 with respect to the original position of the MO medium 10 which is shown in the horizontal line. That is, when viewed from the side of the objective lens 18 which is mounted on the carriage 14, the medium comes closer and gets away in one rotation of the medium due to the surface wobbling. Even in a case in which surface wobbling of the MO medium 10 is present as described above, first, the carriage 14 is moved to a predetermined position in the inner-circumferential side, the focus pull-in control is performed, and the focus servo loop is turned on. In this state, the focus driving current of one rotation of the medium is measured and the value of the mean current thereof is obtained, and the value of the mean current is stored in the memory table 38 as the value of the reference current I1 for setting the lens at the reference lens position P1 at a predetermined position in the inner circumference. Subsequently, in a state in which the focus servo loop is turned on, the carriage 14 is moved to a predetermined point in the outer-circumferential side, i.e., to the point of the carriage 14-1. The focus driving current of one rotation of the medium is measured at the position in the outer-circumferential side at which the surface of the medium is widely wobbled and the value of the mean current thereof is obtained.

The value of the mean current is stored in the memory table 38 as the value of the reference current I2. In the measurement of the focus driving current of one rotation of the medium in the outer-circumferential side, the focus driving current is caused to flow such that the objective lens 18-1 maintains a constant focal length following the surface wobbling of the medium. Therefore, when the focus driving current of one rotation of the medium is averaged, the mean current becomes same as the mean current of the position of the carriage 14 in the inner-circumferential side. As a result, variation due to the surface wobbling does not appear in the reference current I2 obtained by the measurement in the outer-circumferential side. In view of the foregoing, in the present invention, regarding the surface wobbling, the current amplitude of the focus driving current measured in one rotation of the medium corresponds to the surface wobbling quantity; therefore, the amplitude of the focus driving current of one rotation of the medium is detected, and the value thereof is stored in the memory table 38 as the value of surface wobbling. When the reference lens positions according to the reference position line 25 of the case in which surface wobbling is not present in the MO medium 10 are employed and the objective lens 18 is moved to the outer-circumferential side, the objective lens 18 undergoes collision due to the surface wobbling of the MO medium 10. Therefore, the reference lens positions in the outer-circumferential side are corrected in accordance with the surface wobbling quantity. For example, when the surface wobbling of the MO medium 10 in the outermost circumference comes to 10-1 and 10-2 in the correction of the reference lens positions, each quantity of the surface wobbling to the upper side and to the lower side is $\Delta W$, the surface wobbling quantity is $2\Delta W$, and this quantity is obtained as an amplitude A of the focus driving current of one rotation of the medium. Therefore, with respect to the reference lens position according to the reference position line 25 of the case in which surface wobbling is not present, there obtained are corrected reference lens positions 25-2 shown in a position curve which has been corrected such that the objective lens 18 is shifted in the direction getting away from the medium by one quarter of the surface wobbling quantity $2\Delta W$. A corrected reference current corresponding to the corrected reference lens position is caused to flow in the focus actuator, thereby setting the lens reference position corresponding to the surface wobbling quantity.

Figure 8A:
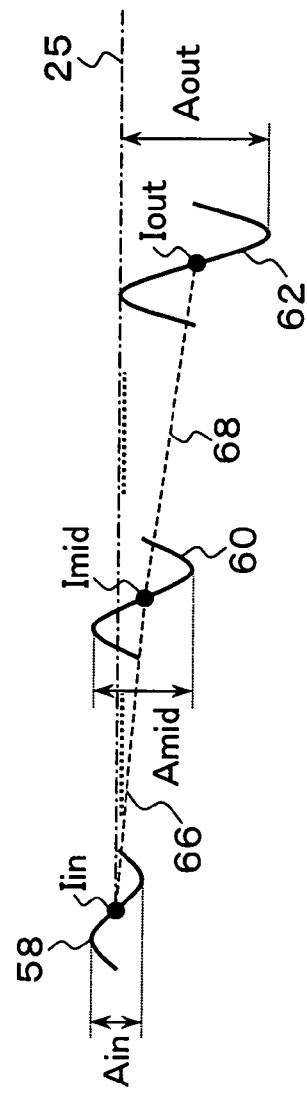
FIGS. 8A and 8B are time charts of focus driving currents measured at three points, i.e., the inner circumference, the middle circumference, and the outer circumference of the medium, reference lens positions, and reference signals of one rotation.
Figure 8B:
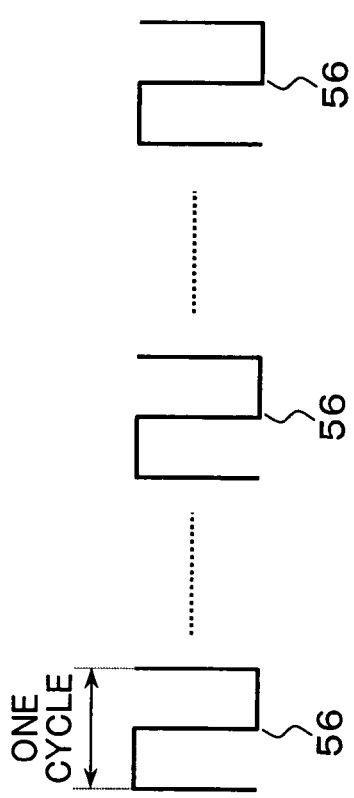

FIGS. 8A and 8B are time charts of focus driving currents (lens actuator driving currents) measured at three points, i.e., the inner circumference, the middle circumference, and the outer circumference of an MO medium, the reference lens positions, and the reference signals of one rotation.

In FIG. 8A, current waveforms of focus driving currents 58, 60, and 62 of one rotation of the medium which have been measured at the inner circumference, the middle circumference, and the outer circumference, respectively, are illustrated; and the respective values of mean currents Iin, Imid, and Iout thereof are stored in the memory table as the values of the reference currents for providing the reference lens positions. Lines 66 and 68 each of which connecting adjacent two points with respect to the reference currents Iin, Imid, and Iout provide the reference currents corresponding to the positions other than that of the measurement points in the radial direction. Current amplitudes Ain, Amid, and Aou of the currents 58, 60, and 62 of one rotation of the medium which have been measured respectively at the inner circumference, the middle circumference, and the outer circumference provide the quantities of surface wobbling in respective positions. In FIG. 8B, one-rotation reference signals 56 corresponding to one rotation of the medium at each of the inner circumference, the middle circumference, and the outer circumference are illustrated.

FIGS. 9A, 9B, and 9C are explanatory drawings of the memory table 38 of FIG. 4 generated in a reference-position learning process of the present invention. In the memory table 38, a work table 70 of FIG. 9A, a control table 72 of FIG. 9B, and a timing table 74 of FIG. 9C are provided. In the work table 70 of FIG. 9A, for example like the case of FIG. 8, mean current values obtained through measurement processes at the inner circumference, the middle circumference, and the outer circumference, the values of surface wobbling (current amplitude), and current values measured in one rotation of the medium are stored. According to the work table 70, the control table 72 of FIG. 9B is created. In the control table 72, the values of the reference current and surface wobbling (current amplitude) corresponding to the track numbers which indicate positions of the medium in the radial direction are stored, and the values of reference current and surface wobbling are calculated by means of linear interpolation employing the values of the mean current and surface wobbling, which have been obtained in the work table 70 of FIG. 9A, of two adjacent measurement points among three measurement points, i.e., the points of the inner circumference, the middle circumference, and the outer circumference, and the calculated values are registered therein. In the timing table 74 of FIG. 9C, there registered are a rotation start timing $T_{start}$ and a rotation stop timing $T_{stop}$ of a period in which the medium gets away from the objective lens in one rotation for performing focus pull-in without moving the objective lens 18, in the focus pull-in control performed after the later-described reference value learning process is completed. In the control table 72 of FIG. 9B, track numbers are employed for representing positions in the radial direction of the medium.

However, like a control table 75 of FIG. 10, the values of the reference current and surface wobbling may be calculated so as to correspond to zone numbers of the medium, and the calculated values are registered therein. In addition, the positions in the radial direction of the medium may be divided into three areas, i.e., that of the inner circumference, the middle circumference, and the outer circumference obtained in the work table 70 of FIG. 9A so as to use the values of the mean current and surface wobbling measured at respective positions.

Next, the first focus pull-in control performed before performing the reference-current learning process of FIG. 4 and the focus pull-in control performed after completion of the reference-current learning process are explained. FIGS. 11A, 11B, and 11C are time charts of the focus pull-in control initially performed at an inner-circumferential position after the medium is loaded. In the initial focus pull-in control performed in the inner-circumferential side, as shown by the focus driving current of FIG. 11A, the focus driving current is increased at a constant rate from initiation of control at time t1, accordingly, the objective lens is moved in the direction toward the medium by, for example, about 300 µm. Subsequently, during time t2 to t3, the focus driving current is maintained at a constant value, thereby setting the wait time for stabilizing the wobbling of the objective lens. When the wait time elapses, the focus driving current is reduced from the time t3, thereby slowly moving the objective lens in the direction getting away from the medium. The movement amount from the time t3 is about 600 µm.

In FIG. 11B, the focus error signal E1 obtained in accordance with forward movement, stoppage, and backward movement of the objective lens by the focus driving current of FIG. 11A is illustrated. When the objective lens is slowly moved from the time t3 in the direction getting away from the medium, the focus error signal E1 drops below an off-focus threshold OFTH and then increases again, and crosses zero at point P of time t4. Therefore, in the focus pull-in control, the zero-cross point P, which comes after the signal drops below the off-focus threshold OFTH, is detected and the servo loop signal E4 is turned on as shown in FIG. 11C, thereby performing servo pull-in. The initial focus pull-in performed in the inner-circumferential side of the medium in FIG. 11A, FIG. 11B, and FIG. 11C, are basically same as conventional focus pull-in control.

Next, the focus pull-in control performed after completion of the reference-position learning process, i.e., the focus pull-in control performed after creation of the memory table having the contents shown in FIGS. 9A, 9B, and 9C will be explained.

The focus pull-in control performed after completion of the reference-position learning process is performed by the following procedure.

(1) The value of the reference current corresponding to a position on the radius of the medium is read out from the memory table 38 and the lens actuator 16 is driven, thereby setting the objective lens 18 at a reference lens position.

(2) The lens actuator 16 is moved in the direction toward the medium by a predetermined distance.

(3) While the lens actuator 16 is moved in the direction getting away from the medium by a predetermined distance, the focus servo loop is turned on at a point at which the focus error signal crosses zero.

Herein, the movement amount of the objective lens 18 in the direction toward the medium in above described (2) is set at a movement amount which is twice the amount of surface wobbling obtained from the memory table 38 corresponding to the focus pull-in position. When the movement amount of the objective lens 18 in the direction toward the medium corresponding to the amount of surface wobbling is set in the above described manner, the movement of the objective lens which corresponds to surface wobbling for focus pull-in can be arranged. Furthermore, the present invention may employ a lens non-drive mode for performing servo pull-in, by utilizing surface wobbling of the medium, in which the focus servo loop is turned on at a zero-cross point of the focus error signal by utilizing the variation of the position of the recording layer due to surface wobbling of the medium without moving the lens actuator 16, in a state in which the lens actuator 16 is set at a reference lens position in accordance with the value of a reference current read out from the memory table 38. In the lens non-drive mode, the rotation period in one rotation in which, due to surface wobbling, the medium gets away from the objective lens which is in a fixed state is detected and registered in the timing table 74 of FIG. 9C, thereby utilizing it.

FIGS. 12A, 12B, 12C, and 12D are time charts showing the positions of the recording layer corresponding to surface wobbling of the medium in a state in which the objective lens is fixed, and variation in the focus error signal of this case. In FIG. 12A, there shown are two positions, i.e., the farthest position of the medium 10-1 and the closest position of the medium 10-2 with respect to the objective lens 18, which is fixedly disposed, in accordance with surface wobbling of the MO medium.

In FIG. 12B, there shown is position variation of the position of the recording layer of the medium in accordance with surface wobbling which causes the medium to approach toward or get away from the objective lens 18 which is in a fixed state, wherein, the variation is varied in one rotation similarly to a sine wave with the farthest position P1 and the closest position P2 serving as peak values. In FIG. 12C, there shown is the focus error signal E1 of this case of which variation is in phase with the variation of the position of the recording layer.

In these charts, the medium gets away from the objective lens 18 during the period from the closest point P2 to the farthest point P3 of the position of the recording layer of FIG. 12B, and during this period, the focus error signal E1 crosses zero at the point P. Therefore, the focus error signal E1 is monitored during the period from P2 to P3 of the position of the recording layer in which the medium gets away from the lens and the servo loop is turned on when zero-cross is detected, thereby performing the focus pull-in control utilizing the movement of the medium due to surface wobbling without moving the objective lens 18. In FIG.

12D, the reference signal of one rotation is shown, wherein the rotation start timing $T_{start}$ of the starting point P2 from which the medium gets away from the lens is obtained by means of the clock count started from the starting point of the one-rotation period $T_0$, and the clock count up to the point P3 at which the medium stops getting away from the lens is obtained as the rotation stop timing $T_{stop}$. The values of the $T_{start}$ and $T_{stop}$ obtained by means of the clock count started from the rotation reference position are registered in the timing table 74 such as that of FIG. 9C and are utilized in a case in which the focus pull-in control is performed without moving the objective lens.

Figure 13:
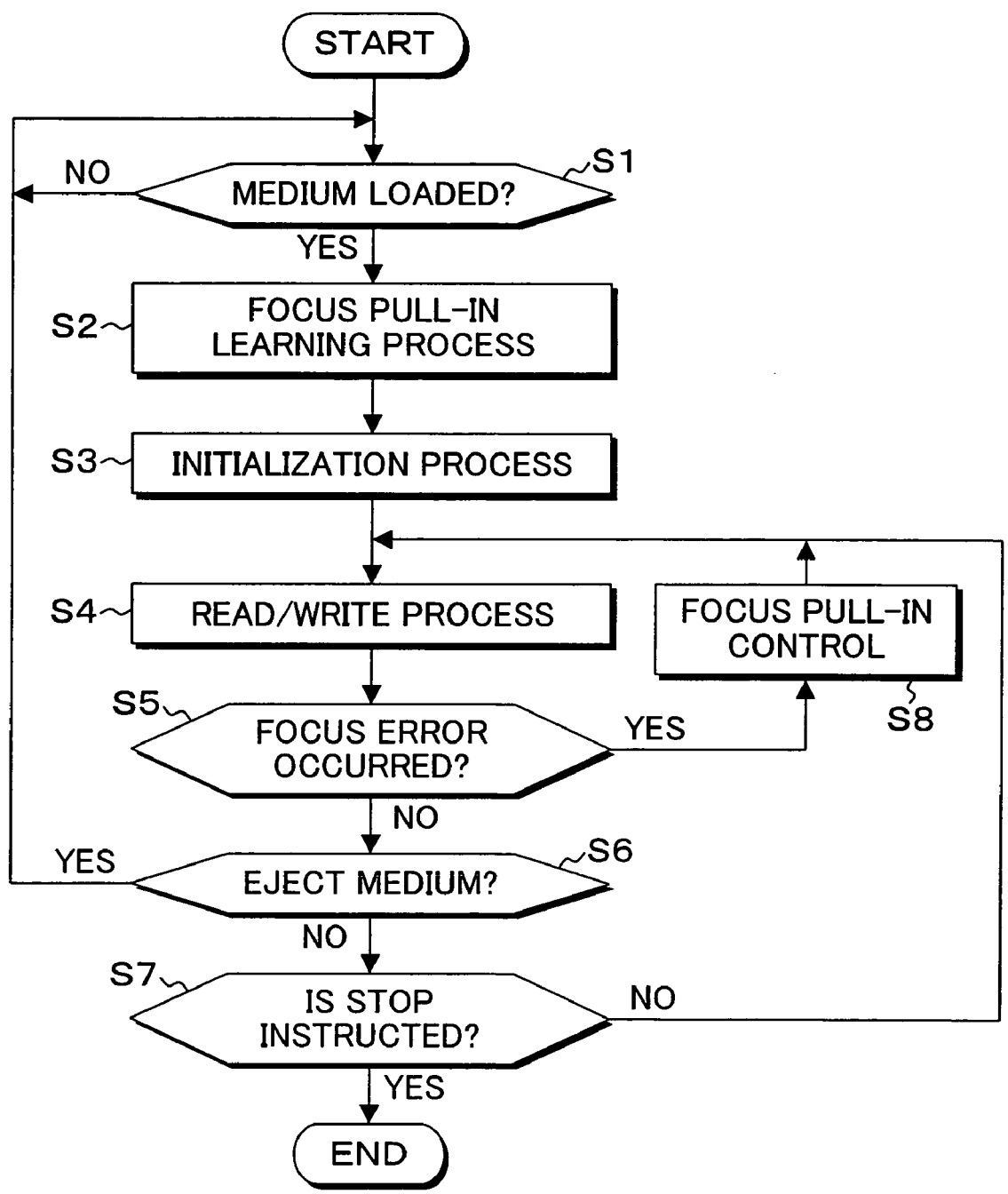
FIG. 13 is a flow chart of a basic procedure of the optical storage system of the present invention.

FIG. 13 is a flow chart of a basic procedure of the optical storage system of the present invention. In FIG. 13, loading of an MO medium is checked in a step S1; and when the MO medium is loaded, the process proceeds to a step S2 in which the focus pull-in learning process by means of the function of the reference-current learning process unit 36, which is provided in the DSP 115 of FIG. 4, is executed, and the memory table 38, in which registered are the values of reference currents and surface wobbling corresponding to positions in the radial direction of the medium and the timing of the loading period in one rotation that the medium gets away from the objective lens, is created. Subsequently, an initialization process is performed in a step S3. In the initialization process, various initialization processes including adjustment of the light to be emitted from a light emitting diode corresponding to the type of the loaded medium are performed. Subsequently, in a step S4, a read or write process is executed according to a command given from the upper level. When a focus error is found in a step S5 during the read or write process due to, for example, impact imposed on the optical storage system, focus pull-in control is performed in a step S8.

This focus pull-in control is the focus pull-in control performed by the reference-position control unit 40 employing the registered information in the memory table 38 of FIG. 4 which has been obtained in the focus pull-in learning process of the step S2. When no focus error is present in the read or write process of the step S4, the process proceeds to a step S6, wherein whether the medium is to be ejected or not is checked. When the medium is not to be ejected, the process of the step S4 is repeated until stop is instructed in a step S7. When ejection of the medium is instructed in the step S6, the process returns to the step S1 so as to wait again the next medium to be loaded.

Figure 14:
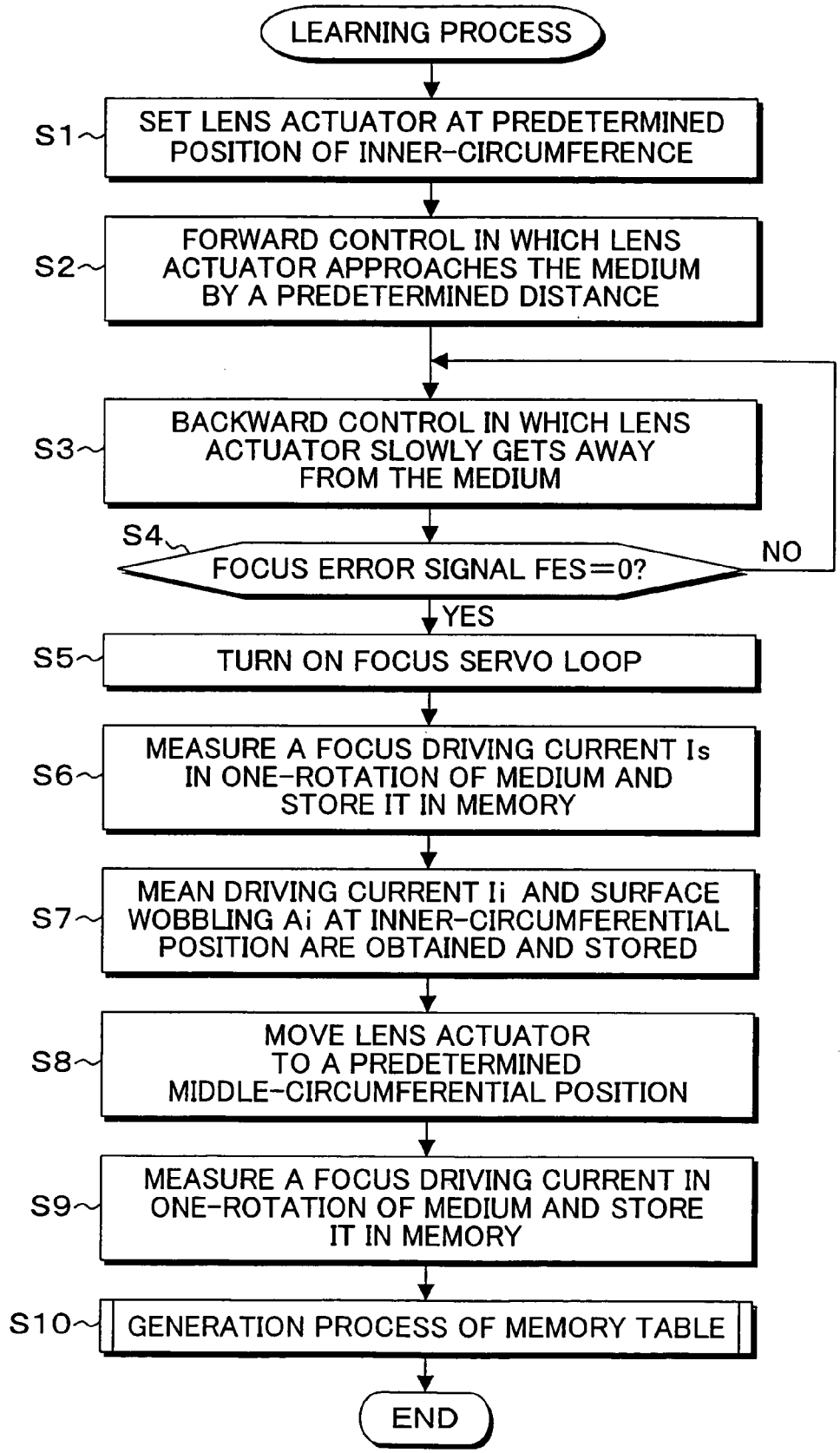
FIG. 14 is a flow chart of a learning process of the present invention performed in the configuration of FIG. 4.

FIG. 14 is a flow chart of the focus pull-in learning process in the step S2 of FIG. 13. In this example, the focus actuator driving current is measured at two points, i.e., a predetermined position in the inner circumference of the medium and a predetermined position in the outer circumference of the medium, and the rotation timing corresponding to all the movement direction of the medium in a case in which the reference current and surface wobbling are constant is obtained. In a step S1 of FIG. 14, for example, in the manner shown in FIG. 5, the lens actuator 16 is set, by moving the carriage 14, at a predetermined position at the inner circumference of the MO medium 10. The inner-circumferential position is the position at which the clearance between the lens and the medium is the widest even if the MO medium 10 is warped due to chucking with respect to the spindle motor, and is the position at which the probability of the achievement of the focus pull-in control is the highest. Then, in a step S2, as is illustrated by the time t1 to t2 of the focus driving current of FIG. 11A, there performed is the forward-movement control for causing the objective lens to approach toward the MO medium 10 by the lens actuator 16 by a predetermined length, for example, about 300 μm. Then, after the wait time for stabilizing the wobbling of the objective lens such as that illustrated by the time t2 to t3 of the FIG. 11A elapses, the backward-movement control for causing the objective lens to slowly get away from the MO medium 10 by the lens actuator 16 is performed in a step S3. During the backward-movement control, whether the focus error signal crosses zero or not is monitored in a step S4. When zero-cross of the focus error signal is detected, the process proceeds to a step S5, and the focus servo loop is turned on. Subsequently, in a step S6, in a state in which focus pull-in is achieved and the focus servo loop is turned on, a focus driving current Is of one rotation of the medium is measured and the value thereof is stored in the memory table 38, specifically, the work table 70 of FIG. 9A as the measured current value of one rotation of the medium.

Subsequently, in a step S7, the values of a mean driving current Ii and surface wobbling Ain which is provided as the current amplitude are obtained from the measured value of the focus driving current of one rotation of the medium and stored in the memory 38. Subsequently, in a step S8, in a state in which the focus servo loop is turned on, the carriage 14 is moved to a predetermined position in the outer-circumferential side like the carriage 14-1, for example, in the manner shown in FIG. 5.

In a step S9, the focus driving current of one rotation of the medium is measured and stored in the memory. Then the values of a mean driving current Iout and surface wobbling Aout of the outer-circumferential position are obtained and stored. Finally, in a step S10, a creation process of the memory table 38 is performed based on the data obtained from measurement results obtained at the two points, i.e., the points at the inner circumference and the outer circumference.

Figure 15:
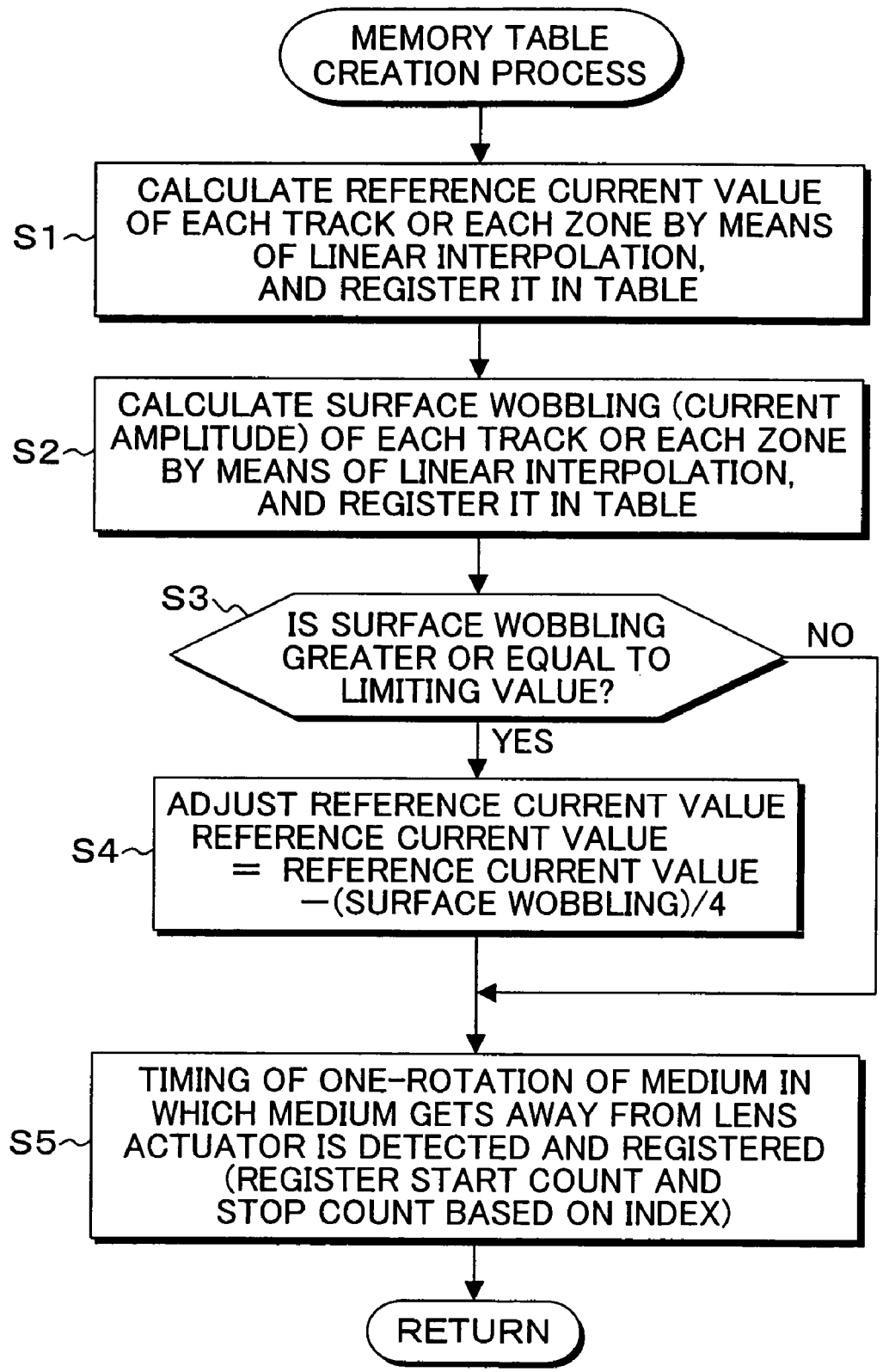
FIG. 15 is a flow chart of a memory table generation process in FIG. 14.

FIG. 15 is a flow chart of the memory table creation process in the step S10 of FIG. 14. In the memory table creation process, since the reference current values at two points at the inner circumference and the outer circumference, i.e., the reference current Iin and the reference current Iout which corresponds to an outer-circumferential position have been obtained, for example, through the learning process of FIG. 14; the control table 72 of FIG. 9B or the control table 75 of FIG. 10, in which the reference current values of each of the tracks or each of the zones are registered, is created by means of the linear interpolation of the line connecting the two points. Subsequently, as well as in a step S2, the values of surface wobbling of each of the tracks or each of the zones are calculated by means of the linear interpolation employing two points, i.e., the values of the surface wobbling (current amplitude) Ain and Aout obtained at two points at the inner circumference and the outer circumference, and the calculated values are registered in the control table 72 of FIG. 9B or the control table 75 of FIG. 10. Subsequently, in a step S3, the values of surface wobbling registered in the table are sequentially read out and are checked whether the values of the surface wobbling are greater or equal to a predetermined limiting value or not. If the value of the surface wobbling is greater or equal to the limiting value, the medium may collide with the lens due to surface wobbling at the reference current position attained by the reference current of this case. Therefore, in this case, the process proceeds to a step S4 and the reference current value is adjusted. In the adjustment of the reference current value, the value of one quarter of the surface wobbling quantity which is exceeding the limiting value is subtracted from the reference current value, thereby performing the adjustment. The adjustment of the reference current value in the step S4 corresponding to the surface wobbling provides a corrected reference current value for providing the corrected reference current position 25-2 in which, as shown in FIG. 7, the position according to the reference current value 25 obtained in the step S1 are adjusted in the direction getting away from the medium in accordance with the surface wobbling quantity. Furthermore, in a step S5, the rotation period timing of one rotation of the medium in which the medium gets away from the lens actuator is detected and registered as the rotation start timing $T_{start}$ and the rotation stop timing $T_{stop}$, for example, as shown in the timing table 74 of FIG. 9C. The rotation start timing and the rotation stop timing can be obtained, for example, from the current value of one rotation of the medium that have been measured, for example, with respect to the inner circumference in the work table 70 of FIG. 9A. In this example, the measured current value of one rotation of the medium is simply shown as "01234566543210". In the value, the section "0123456" in which the current value is increasing corresponds to the rotation period of one rotation of the medium in which the medium is getting away from the lens while the lens is fixed. The rotation start timing $T_{start}$ and the rotation stop timing $T_{stop}$ are obtained, for example, by means of a clock counter started from the rise, and are registered in the timing table 74.

Figure 16:
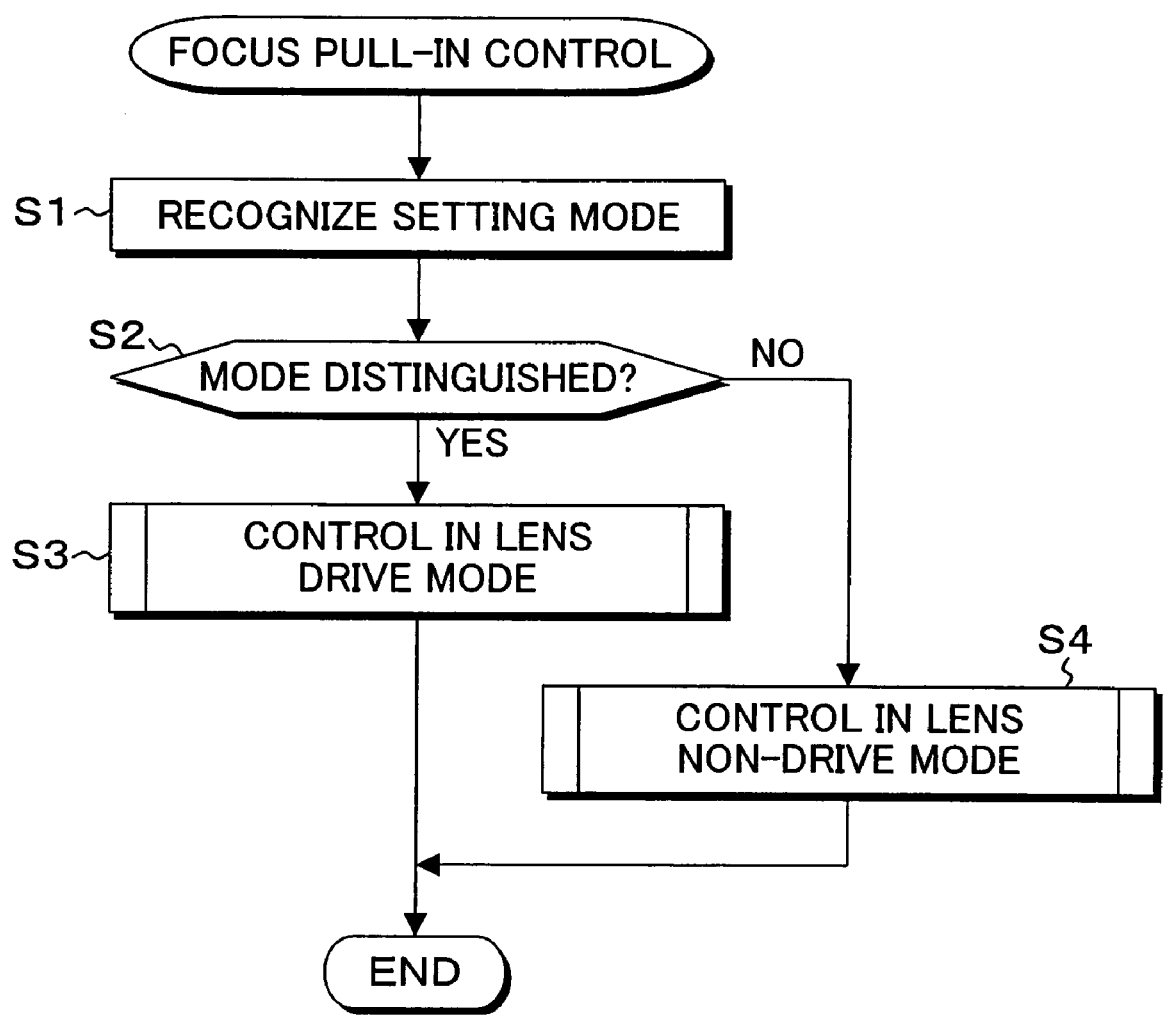
FIG. 16 is a flow chart of the focus pull-in control performed after a learning process, in the configuration of FIG. 4.

FIG. 16 is a flow chart of the focus pull-in control performed in the step S8 of FIG. 13 after the focus pull-in learning process is completed.

In the focus pull-in control after the learning process is completed, the setting mode for the focus pull-in control is recognized in a step S1. When the mode is a lens drive mode, the process proceeds to a step S3 and the focus pull-in control according to the lens drive mode is performed; and when the mode is a lens non-drive mode, the process proceeds to a step S4 and the focus pull-in control according to the lens non-drive mode is performed. The setting of the mode of the focus pull-in control, i.e., the lens drive mode or the lens non-drive mode can be switched depending on whether the value of the surface wobbling (current amplitude) exceeds the reference value or not. When the value is equal to or less than the reference value, the mode is in the lens drive mode.

Figure 17:
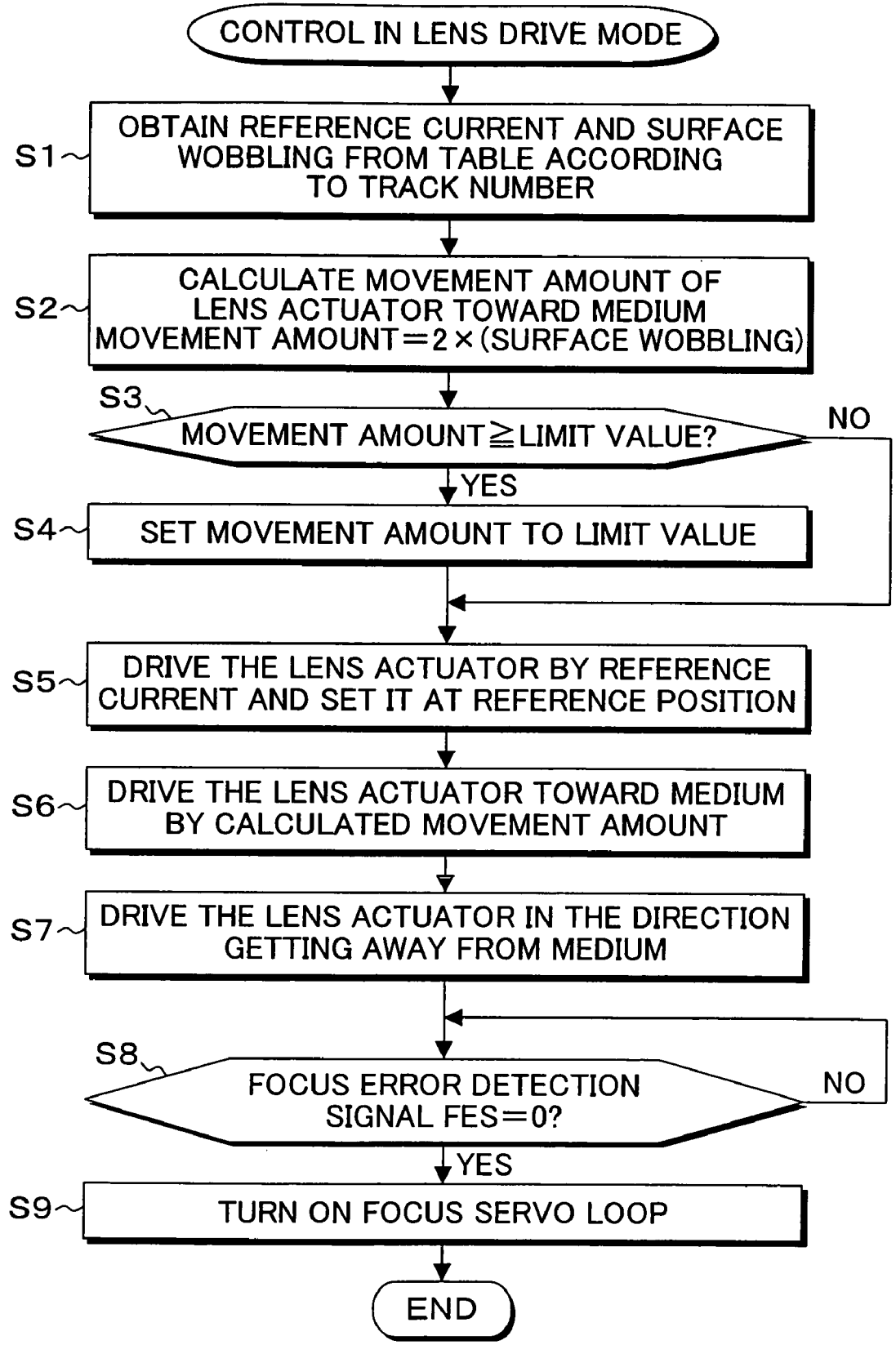
FIG. 17 is a flow chart of the focus pull-in control in a lens drive mode of FIG. 16.

FIG. 17 is a flow chart of the focus pull-in control in the lens drive mode in the step S3 of FIG. 16. In the lens drive mode control, in a step S1, the values of the reference current and the surface wobbling are obtained according to the track number, for example, from the control table 72 of FIG. 9B; and, in a step S2, the movement amount which is two times the amount of the surface wobbling at the time is obtained as the movement amount for making the lens actuator 16 approach the medium.

Subsequently, in a step S3, when the calculated movement amount is confirmed to be greater than or equal to the limit value, the movement amount is set to the limit value in a step S4, thereby preventing the medium from contact with the objective lens 18 which is due to the surface wobbling. Subsequently, in a step S5, the reference current is caused to flow in the lens actuator 16 as the focus driving current, thereby setting it at the reference lens position. Subsequently, in a step S6, the lens actuator 16 is driven toward the medium merely by the movement amount calculated in the step S2. Subsequently, while the lens actuator 16 is driven in the direction getting away from the medium in a step S7, the zero-cross of the focus error signal is monitored in a step S8. When the zero-cross of the focus error signal is detected in the step S8, the focus servo loop is turned on in a step S9, thereby performing servo pull-in. In such control in the lens drive mode, the objective lens 18 is moved forward toward the medium side while employing the reference lens position measured in the learning process as the starting point, and then, the objective lens is moved slowly in the direction getting away from the medium and the focus servo loop is turned on at the point when the zero-cross of the focus error signal is detected; therefore, at the learnt reference position, the focal point of the optical beam of the objective lens is approximately at the position meeting with the recording layer of the medium. When focus pull-in is performed from this position, focus pull-in can be quickly and reliably achieved without causing the medium to collide with the lens actuator 16 even when surface wobbling or warpage are present in the medium.

Figure 18:
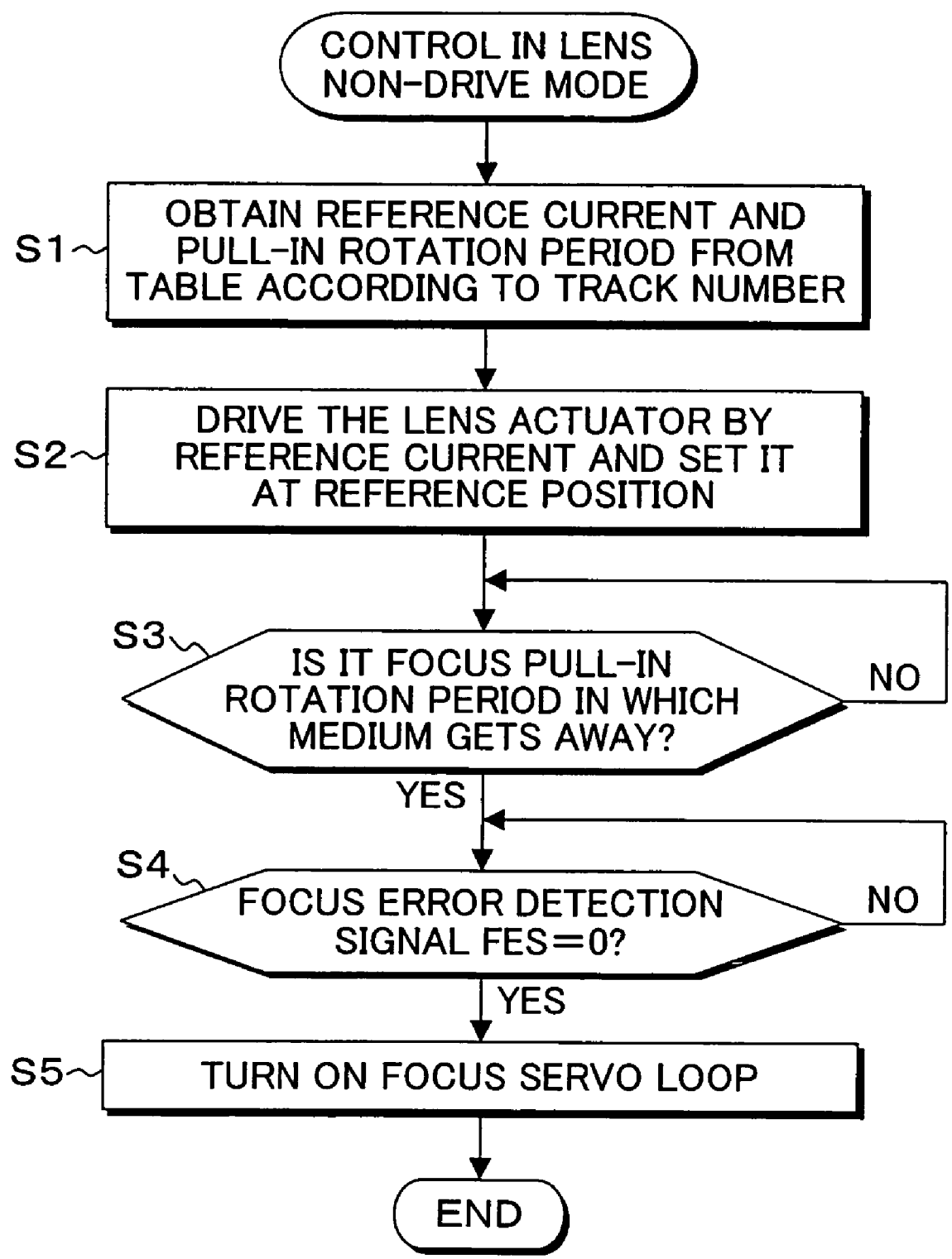
FIG. 18 is a flow chart of the focus pull-in control in a lens non-drive mode of FIG. 16.

FIG. 18 is a flow chart of the focus pull-in control in the lens non-drive mode in the step S4 of FIG. 16. In the focus pull-in control in the lens non-drive mode, in a step S1, the reference current is obtained according to the track number of the position in the radial direction of the medium at which focus pull-in is performed, for example, from the control table 72 of FIG. 9B, and the values of the rotation start timing and the rotation stop timing representing the pull-in rotation period are obtained from the timing table 74 of FIG. 9C.

Next, in a step S2, the lens actuator 16 is driven by the reference current, thereby setting the objective lens 18 at the reference lens position, and the lens is fixed at the reference lens position.

Next, whether it is the focus pull-in rotation period in which the medium gets away or not is checked in a step S3, and when it is the focus pull-in rotation period, the process proceeds to a step S4 and whether the focus error detection signal crosses zero or not is monitored. In the state in which the objective lens 18 is fixed at the reference lens position, the focus error signal E1 varies such as that from the rotation start timing $T_{start}$ to the rotation stop timing $T_{stop}$ of FIG. 12C, and when the point P at which the signal crosses zero is detected, the process proceeds to a step S5 and the focus servo loop is turned on, thereby performing focus servo pull-in. In the focus pull-in control in the lens non-drive mode, while the objective lens is merely set and kept in a fixed state at the reference lens position which has been obtained through the learning process, pull-in by means of turning-on of the focus servo loop is performed when the focus error detection signal crosses zero in accordance with the variation of the position, which is due to surface wobbling, of the recording layer of the medium with respect to the objective lens, and the lens actuator 16 is not moved for focus pull-in. Therefore, collision of the medium with the objective lens can be completely avoided even when surface wobbling of the medium is present.

Figure 19:
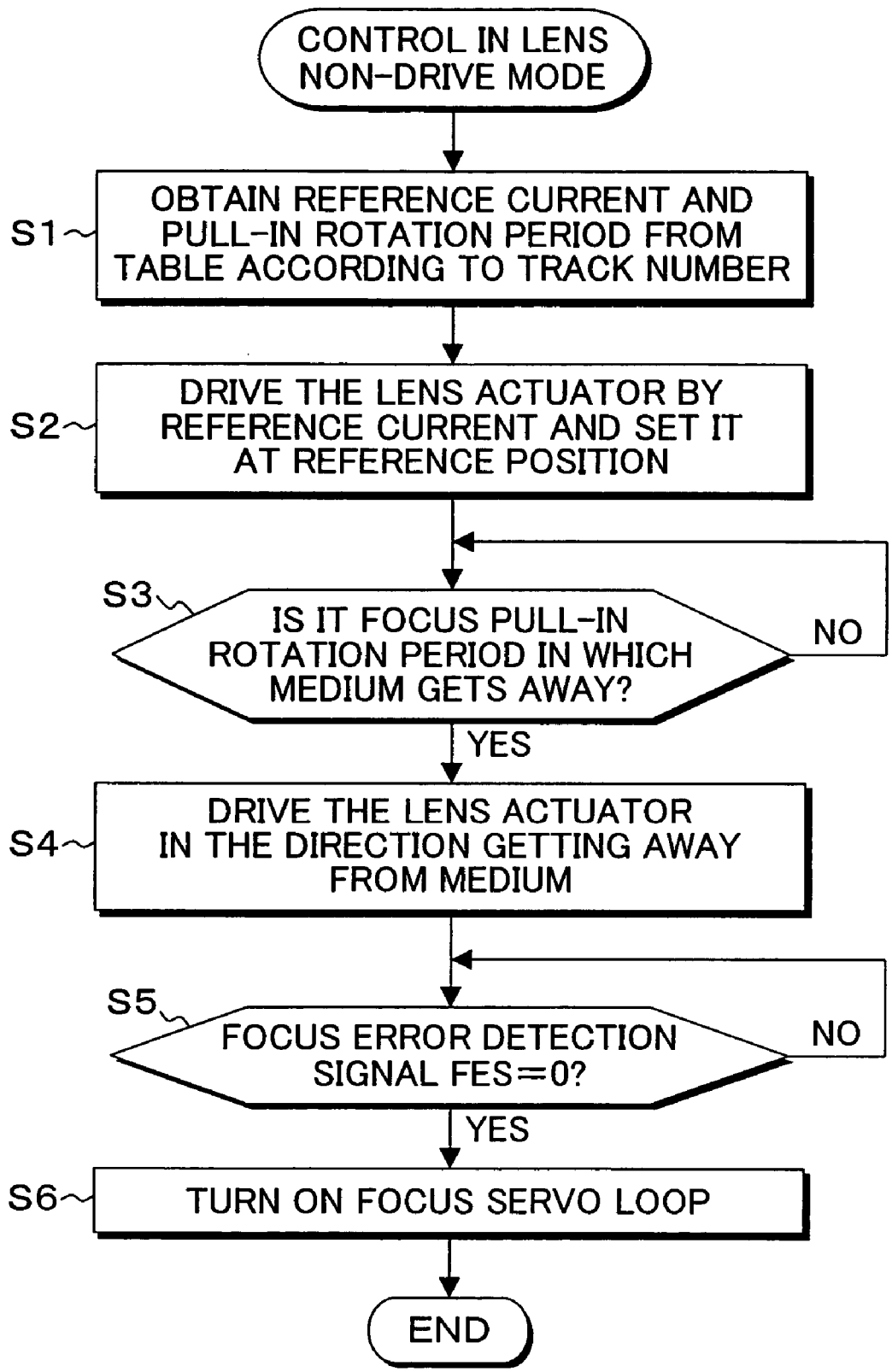
FIG. 19 is a flow chart of another embodiment of the focus pull-in control in the lens non-drive mode of FIG. 16.

In FIG. 19, another embodiment of the focus pull-in control in the lens non-drive mode in the step S4 of FIG. 16 is shown, which embodiment is characterized in that, in addition to the lens non-drive mode control of FIG. 18, at the timing of the focus pull-in rotation period in which the medium gets away from the objective lens, the lens actuator is further driven actively in the direction getting away from the medium. That is, the processes of the steps S1 through S3 of FIG. 19 are same as that of the steps S1 through S3 of FIG. 18. Also, the processes of the steps S5 through S6 of FIG. 19 are same as the processes of the step S4 through S5 of FIG. 18. In addition to the above described processes, a process for driving the lens actuator 16 in the direction getting away from the medium is newly added as a step S4 between the step S3 and S5 of FIG. 19. When the objective lens 18 is not kept in a fixed state in the period during the focus pull-in rotation period in which the medium gets away from the lens after the objective lens 18 is set and fixed at the reference lens position and the objective lens is actively moved toward the side away from the medium, the focus error signal crosses zero in shorter time, thereby further shortening the time required for performing focus pull-in.

Meanwhile, the above described embodiments are examples of a case in which the focus pull-in control upon generation of an focus error in a read process or a write process corresponding to a command given from the upper level is performed after a learning process, however, in addition to that, the focus pull-in control based on the learnt result may be performed at an arbitrary timing at which focus pull-in control is required.

The present invention includes arbitrary modification that does not impair objects and advantages thereof, and the present invention is not limited by the numerical values shown in the above described embodiments.

According to the above described present invention, upon insertion of a medium, a focus driving current of one rotation of the medium is measured by performing focus pull-in control in the vicinity of the outer circumference of the medium and the mean current thereof is obtained; a learning process for obtaining the mean current as a reference current for driving the lens to the reference lens position at which focus pull-in is started is performed; in relation to focus pull-in control thereafter, the objective lens is set at a reference lens position by driving the lens actuator by the reference current obtained through the learning process, thereby performing focus pull-in control; and at the reference lens position, the focal point of the optical beam of the objective lens is at a position near the focal position corresponding to the recording layer of the medium. Therefore, stable focus pull-in control always originated from the optimum starting position for focus pull-in control can be realized.

In addition, the current of one rotation of the medium is measured at least two points in the radial direction of the medium and the value of each of them is averaged, thereby performing the learning process for storing the values of the reference current indicating reference lens positions; and in the focus pull-in control performed after the learning process is completed, the reference current corresponding to a position in the radius of the medium is selected and the lens actuator is subjected to positioning; therefore, collision of the medium with the objective lens can be reliably monitored even if variation due to warpage caused by chucking of the medium is present, by performing the focus pull-in control after the lens position is set such that the distance between the recording layer of the medium to the objective lens corresponding to the warpage is constantly maintained at all times.

In addition, the value of the surface wobbling is detected from the amplitude of the driving current of one rotation of the medium, and the reference current value is corrected such that the reference lens position according to the reference current is adjusted in accordance with the value of the surface wobbling; therefore, the objective lens is set at the reference lens position and the focus pull-in control can be reliably performed without causing collision of the medium with the objective lens even if surface wobbling is present in the medium by virtue of the adjustment of the reference value corresponding to surface wobbling.

In addition, in the focus pull-in control for driving the objective lens after the learning process for obtaining the values of the reference lens position and surface wobbling is completed, the focus pull-in control is performed with the movement of the objective lens corresponding to the surface wobbling quantity; therefore, pull-in failure in which, for example, the zero-cross point of the focus error signal is not generated due to the surface wobbling can be reliably avoided.

In addition, when pull-in control is performed by turning on the focus servo loop upon detection of the zero-cross of the focus error signal utilizing the position variation due to surface wobbling of the medium, in a state in which the objective lens is set and fixed at a reference lens position according to a reference current, the focus pull-in control can be realized while the objective lens is not moved by the lens actuator; therefore, collision of the medium with the objective lens can be reliably avoided even if surface wobbling is present in the medium since the focus actuator is not moved.

What is claimed is:

1. An optical storage system having a carriage actuator for moving an objective lens, which is for irradiating a medium with an optical beam, in the direction across tracks of the medium,
    a lens actuator for moving the objective lens in the direction toward the medium,
    a focus error signal generation circuit for generating a focus error signal indicating deviation between the focal point of the optical beam and a recording layer of the medium in accordance with received output of the light returned from the medium, and
    a focus pull-in control unit for closing a focus servo loop at a point where the focus error signal crosses zero while slowly moving the objective lens in the direction getting away from the medium after the objective lens is moved in the direction toward the medium by a predetermined distance in a state in which the medium is being rotated, the optical storage system comprising:
    a reference-position learning unit for measuring a current of one rotation of the medium in a state in which the focus of the objective lens is pulled-in by the focus pull-in control unit at a predetermined point in the radial direction of the medium upon insertion of the medium, calculating a mean current value thereof, and storing the calculated mean current value in a memory as a reference current value for positioning the objective lens at a reference position at which focus pull-in control is started; and
    a reference-position control unit for causing the focus pull-in control unit to perform focus pull-in after positioning the objective lens in accordance with the reference current when focus pull-in is performed after the learning process.

2. The optical storage system according to claim 1, wherein
    the reference-position learning unit measures a current of one rotation of the medium at least two points in the radial direction of the medium and stores the reference current values; and
    the reference-position control unit selects a reference current corresponding to a position of the objective lens in the radius of the medium and positions the objective lens.

3. The optical storage system according to claim 2, wherein,
    after a current of one rotation of the medium is measured in a state in which focus of the objective lens is pulled-in at a predetermined point in the inner circumference of the medium by the focus pull-in control unit, the reference-position learning unit moves the objective lens to a predetermined point in the outer circumferential side while keeping the focus servo loop closed and measures a current of one rotation of the medium.

4. The optical storage system according to claim 3, wherein
    the reference-position control unit obtains a reference current corresponding to a position other than the measurement points in the radius of the medium from a relational expression of a line relating the values of the reference current obtained from the values of the current measured at the two points in the radial direction of the medium.

5. The optical storage system according to claim 1, wherein,
    based on the measured current of one rotation of the medium, the reference-position learning unit obtains the value of current displacement (amplitude), as a surface wobbling quantity, corresponding to the movement amount of the medium in the direction toward the objective lens and the movement amount of the medium in the direction getting away from the objective lens, wherein each of the amounts is that in one rotation of the medium, and stores the obtained value in the memory; and,
    after the objective lens is positioned in accordance with the reference current, the reference-position control unit sets a movement amount twice the surface wobbling quantity as a movement distance of the objective lens in the direction toward the medium, and causes the focus pull-in control unit to perform focus pull-in.

6. The optical storage system according to claim 1, wherein,
    based on the measured current of one rotation of the medium, the reference-position learning unit obtains the value of current displacement, as a surface wobbling quantity, corresponding to the movement amount of the medium in the direction toward the objective lens and the movement amount in the direction getting away from the objective lens, wherein each of the amounts is that in one rotation of the medium, and stores the obtained value in the memory; and,
    when the value of the surface wobbling quantity at a point in the radius of the medium at which focus pull-in is to be performed exceeds a predetermined limit value, the reference-position control unit adjusts the reference current such that the objective lens is positioned away from the medium and positions the objective lens thereat, and then, causes the focus pull-in control unit to perform focus pull-in.

7. The optical storage system according to claim 6, wherein,
    when the value of the surface wobbling quantity at a point in the radius of the medium at which focus pull-in is to be performed exceeds a predetermined limit value, the reference-position control unit adjusts the reference current such that the objective lens is positioned away from the medium by a distance one quarter of the surface wobbling quantity and positions the objective lens.

8. The optical storage system according to claim 1, wherein,
    based on the measured current of one rotation of the medium, the reference-position learning unit obtains a period in one rotation of the medium in which the medium is moving in the direction getting away from the objective lens as a pull-in rotation period and stores the period in the memory; and the reference-position control unit positions the objective lens in accordance with the reference current, and then, without moving the objective lens by the focus pull-in control unit, causes focus pull-in to be performed at timing when the focus error signal crosses zero within the pull-in rotation period.

9. The optical storage system according to claim 1, wherein, based on the measured current of one rotation of the medium, the reference-position learning unit obtains a rotation period in one rotation of the medium in which the medium is moving in the direction getting away from the lens as a pull-in rotation period and stores the period in the memory; and, at a start timing of the pull-in rotation period after the objective lens is positioned in accordance with the reference current, the reference-position control unit causes the focus pull-in control unit to perform focus pull-in by starting movement of the objective lens in the direction getting away from the medium.

10. A focus pull-in control method of an optical storage system having a carriage actuator for moving an objective lens, which is for irradiating a medium with an optical beam, in the direction across tracks of the medium, a lens actuator for moving the objective lens in the direction toward the medium, a focus error signal generation circuit for generating a focus error signal indicating deviation between the focal point of the optical beam and a recording layer of the medium in accordance with received output of the light returned from the medium, and a focus pull-in control unit for closing a focus servo loop at a point where the focus error signal crosses zero while slowly moving the objective lens in the direction getting away from the medium after the objective lens is moved in the direction toward the medium by a predetermined distance in a state in which the medium is being rotated, the focus pull-in control method comprising:

a reference-position learning step of measuring a current of one rotation of the medium in a state in which the focus of the objective lens is pulled-in by the focus pull-in control unit at a predetermined point in the radial direction of the medium upon insertion of the medium, calculating a mean current value thereof, and storing the calculated mean current value in a memory as a reference current value for positioning the objective lens at a reference position at which focus pull-in control is started; and a reference-position control step of causing the focus pull-in control unit to perform focus pull-in after positioning the objective lens in accordance with the reference current when focus pull-in is performed after the learning process.

11. The focus pull-in control method according to claim 10, wherein, in the reference-position learning step, a current of one rotation of the medium is measured at least two points in the radial direction of the medium and the reference current values are stored; and, in the reference-position control step, a reference current corresponding to a position of the objective lens in the radius of the medium is selected and the objective lens is positioned.

12. The focus pull-in control method according to claim 11, wherein, in the reference-position learning step, after a current of one rotation of the medium is measured in a state in which focus of the objective lens is pulled-in at a predetermined point in the inner circumference of the medium by the focus pull-in control unit, the objective lens is moved to a predetermined point in the outer circumferential side while the focus servo loop is kept closed and a current of one rotation of the medium is measured.

13. The focus pull-in control method according to claim 12, wherein, in the reference-position control step, a reference current corresponding to a position other than the measurement points in the radius of the medium is obtained from a relational expression of a line relating the values of the reference current obtained from the values of the current measured at the two points in the radial direction of the medium.

14. The focus pull-in control method according to claim 10, wherein, in the reference-position learning step, based on the measured current of one rotation of the medium, the value of current displacement (amplitude) corresponding to the movement amount of the medium in the direction toward the objective lens and the movement amount of the medium in the direction getting away from the objective lens, wherein each of the amounts is that in one rotation of the medium, is obtained as a surface wobbling quantity, and the obtained value is stored in the memory; and, in the reference-position control step, after the objective lens is positioned in accordance with the reference current, a movement amount twice the surface wobbling quantity is set as a movement distance of the objective lens in the direction toward the medium, and the focus pull-in control unit is caused to perform focus pull-in.

15. The focus pull-in control method according to claim 10, wherein, in the reference position learning step, based on the measured current of one rotation of the medium, the value of current displacement corresponding to the movement amount of the medium in the direction toward the objective lens and the movement amount of the medium in the direction getting away from the objective lens, wherein each of the amounts is that in one rotation of the medium, is obtained as a surface wobbling quantity and stored in the memory; and, in the reference-position control step, when the value of the surface wobbling quantity at a point in the radius of the medium at which focus pull-in is to be performed exceeds a predetermined limit value, the reference current is adjusted such that the objective lens is positioned away from the medium, and then, the focus pull-in control unit is caused to perform focus pull-in.

16. The focus pull-in control method according to claim 15, wherein, in the reference-position control step, when the value of the surface wobbling quantity at a point in the radius of the medium at which focus pull-in is to be performed exceeds a predetermined limit value, the reference current is adjusted such that the objective lens is positioned away from the medium by a distance one quarter of the surface wobbling quantity and the objective lens is positioned.

17. The focus pull-in control method according to claim 10, wherein,
in the reference-position learning step, based on the measured current of one rotation of the medium, a period in one rotation of the medium in which the medium is moving in the direction getting away from the objective lens is obtained as a pull-in rotation period and stored in the memory; and,
in the reference-position control step, the objective lens is positioned in accordance with the reference current, and then, without moving the objective lens by the focus pull-in control unit, focus pull-in is caused to be performed at timing when the focus error signal crosses zero within the pull-in rotation period.

18. The focus pull-in control method according to claim 10, wherein,
in the reference-position learning step, based on the measured current of one rotation of the medium, a rotation period in one rotation of the medium in which the medium is moving in the direction getting away from the objective lens is obtained as a pull-in rotation period and stored in the memory; and,
in the reference-position control step, at a start timing of the pull-in rotation period after the objective lens is positioned in accordance with the reference current, the focus pull-in control unit is caused to perform focus pull-in by starting movement of the objective lens in the direction getting away from the medium.

* * * * *